United States Patent

Kadota

(10) Patent No.: US 6,898,504 B2
(45) Date of Patent: May 24, 2005

(54) VEHICLE DRIVING FORCE CONTROL APPARATUS

(75) Inventor: Keiji Kadota, Zama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 35 days.

(21) Appl. No.: 10/632,833

(22) Filed: Aug. 4, 2003

(65) Prior Publication Data

US 2004/0034461 A1 Feb. 19, 2004

(30) Foreign Application Priority Data

Aug. 13, 2002 (JP) ........................................ 2002-235655

(51) Int. Cl.$^7$ ............................. B60L 11/00; B60K 6/00
(52) U.S. Cl. ............................. 701/67; 701/69; 180/243
(58) Field of Search .............................. 701/67, 69, 22; 180/242, 243, 65.2, 65.8

(56) References Cited

U.S. PATENT DOCUMENTS

| | | | |
|---|---|---|---|
| 4,180,138 A | 12/1979 | Shea | |
| 5,036,718 A | 8/1991 | Bulgrien | |
| 6,321,865 B1 * | 11/2001 | Kuribayashi et al. | ....... 180/243 |
| 6,434,469 B1 | 8/2002 | Shimizu et al. | |
| 6,442,454 B1 | 8/2002 | Akiba et al. | |
| 6,464,608 B2 * | 10/2002 | Bowen et al. | .................. 475/5 |
| 6,606,549 B1 * | 8/2003 | Murakami et al. | ............ 701/89 |
| 2002/0107101 A1 | 8/2002 | Bowen et al. | |
| 2003/0010559 A1 | 1/2003 | Suzuki | |
| 2003/0064858 A1 | 4/2003 | Saeki et al. | |
| 2003/0089539 A1 | 5/2003 | Kadota | |
| 2003/0151381 A1 | 8/2003 | Kadota et al. | |

FOREIGN PATENT DOCUMENTS

| | | |
|---|---|---|
| EP | 0 241 215 A2 | 10/1987 |
| EP | 0 314 452 A2 | 5/1989 |
| EP | 0 799 740 A2 | 10/1997 |
| EP | 0 963 892 A2 | 12/1999 |
| EP | 1 127 735 A2 | 8/2001 |
| EP | 1 226 993 A1 | 7/2002 |
| JP | 11-243608 A | 9/1999 |
| JP | 2001-138764 A | 5/2001 |
| JP | 2001-146930 A | 5/2001 |
| JP | 2002-200932 A | 7/2002 |
| JP | 2002-218605 A | 8/2002 |
| JP | 2003-025861 A | 1/2003 |
| JP | 2003-130200 A | 5/2003 |
| JP | 2003-156079 A | 5/2003 |
| JP | 2003-209902 A | 7/2003 |
| WO | WO 02-064996 A1 | 8/2002 |
| WO | WO 02-087916 A1 | 11/2002 |

* cited by examiner

*Primary Examiner*—Michael J. Zanelli
(74) *Attorney, Agent, or Firm*—Shinjyu Global IP Counselors, LLP

(57) ABSTRACT

A vehicle driving force control apparatus is configured for a four-wheel drive vehicle that switches between a four-wheel drive state and a two-wheel drive state. The driving force control apparatus improves the response when a vehicle shifts into a four-wheel drive state while starting to move from a state of rest and, simultaneously, avoids the occurrence of shock when the clutch is connected. When the rotational speeds of the motor and the rear wheels reach or fall below their respective minimum detectable rotational speeds, the controller calculates estimated times until the motor and the rear wheels will stop based on the rotational speeds detected up until the minimum detectable rotational speed was reached and begins counting down from those estimated times. Since the clutch is connected after both estimated times have reached zero, the clutch is connected while reliably avoiding the occurrence of shock.

21 Claims, 13 Drawing Sheets

VEHICLE DRIVING FORCE CONTROL APPARATUS

BACKGROUND OF THE INVENTION

1. Field of the Invention

The present invention generally relates to a vehicle driving force control apparatus for a four-wheel drive vehicle. More specifically, the present invention relates to a vehicle driving force control apparatus for a four-wheel drive vehicle that switches between a four-wheel drive state and a two-wheel drive state in response to such factors as a traveling state.

2. Background Information

An example of this kind of four-wheel drive vehicle driving force control apparatus is disclosed in Japanese Laid-Open Patent Publication No. 11-243608. In the vehicle described in that publication, the front wheels are the main drive wheels that are driven by an internal combustion engine, while the rear wheels are the subordinate drive wheels that are driven by an electric motor. When the vehicle is in a four-wheel drive state, both the front and rear wheels are driven together. A clutch and a reduction gear are installed in the torque transfer path between the electric motor and the rear wheel axle. The technology disclosed in this publication employs a drive control method in which the electric motor is rotated in an unloaded state until it reaches a rotational speed equivalent to the rotational speed of the rear wheel axle before connecting the clutch. After the clutch is connected, the output torque of the electric motor is then increased gradually.

In view of the above, it will be apparent to those skilled in the art from this disclosure that there exists a need for an improved vehicle driving force control apparatus. This invention addresses this need in the art as well as other needs, which will become apparent to those skilled in the art from this disclosure.

SUMMARY OF THE INVENTION

It has been discovered that the drive control method just described results in a the delay in the response of the vehicle to a driver's request to start moving or to accelerate in situations where acceleration slippage occurs easily, such as when the vehicle is initially starting to move from a state of rest. In particular, result is due to the fact that the connection of the clutch and the gradual increasing of the motor torque are conducted after acceleration slippage of the front wheels (main drive wheels) is detected.

One feasible method to improve the vehicle response when the vehicle starts to move from a rest state is to connect the clutch while the vehicle is stopped (i.e., before the vehicle starts to move). This enables the required motor torque to be applied from the initial stage of starting to move while avoiding the occurrence of shock when the clutch is connected.

A feasible way to determine if the vehicle is stopped is to detect the wheel speed, but it is possible that the electric motor and the input side of clutch will still be rotating when the wheels stop (vehicle stops) immediately after shifting from a four-wheel drive state to a two-wheel drive state. Consequently, even though the vehicle is determined to be in a stopped state based on the wheel speed, there is the risk that a rotational speed difference greater than or equal to a prescribed value will still exist between the input shaft and the output shaft of the clutch, thus causing shock to occur when the clutch is connected.

Moreover, rotation sensors that detect the rotational speed of wheels and the like generally are not able to detect accurately when the rotational speed is very low because the magnetic flux pulse is small. In other words, in the course of decelerating to a stopped state, the wheels of a vehicle enter a region of very slow rotation where the rotation sensor is substantially unable to detect the rotational speed. Thus, in this situation, it is impossible to determine when the vehicle has stopped. Consequently, there is a problem in that it cannot be determined if the clutch should be connected.

The present invention was conceived in view of these problems and its object is to provide a four-wheel drive vehicle driving force control apparatus that can improve the vehicle response with which the vehicle shifts to a four-wheel drive state when the vehicle is starting to move while avoiding the occurrence of shock when the clutch is connected.

In order to achieve the aforementioned object, the present invention provides a vehicle driving force control apparatus for a vehicle power train having a clutch installed in a torque transfer path from a drive source to a wheel, the clutch having an input part connected to the drive source and an output part connected to the wheel. The vehicle driving force control apparatus basically comprises an output rotational speed sensor, an input rotational speed sensor, an output stop estimating section, an input stop estimating section, a vehicle stop determining section, a clutch stop determining section and a clutch connection command outputting section. The output rotational speed sensor is configured to detect an output rotational speed of the output part of the clutch and produce an output rotational speed value. The input rotational speed sensor is configured to detect an input rotational speed of the input part of the clutch and produce an input rotational speed value. The output stop estimating section is configured to estimate that the rotation of the output part has stop rotating upon an occurrence of a detected first parameter that is based on the output rotational speed value received from the output rotational speed sensor. The input stop estimating section is configured to estimate that the rotation of the input part has stop rotating upon an occurrence of a detected second parameter that is based on the input rotational speed value received from the input rotational speed sensor. The vehicle stop determining section is configured to a determination whether the vehicle has stopped. The clutch stop determining section is configured to determine that the clutch has stopped rotating based on a determination of the occurrences of the detected output and input parameters, upon the vehicle stop determining section determining that the vehicle has stopped. The clutch connection command outputting section is configured to output a clutch connection command to connect the clutch, upon the clutch stop determining section determining that the clutch has stopped rotating.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
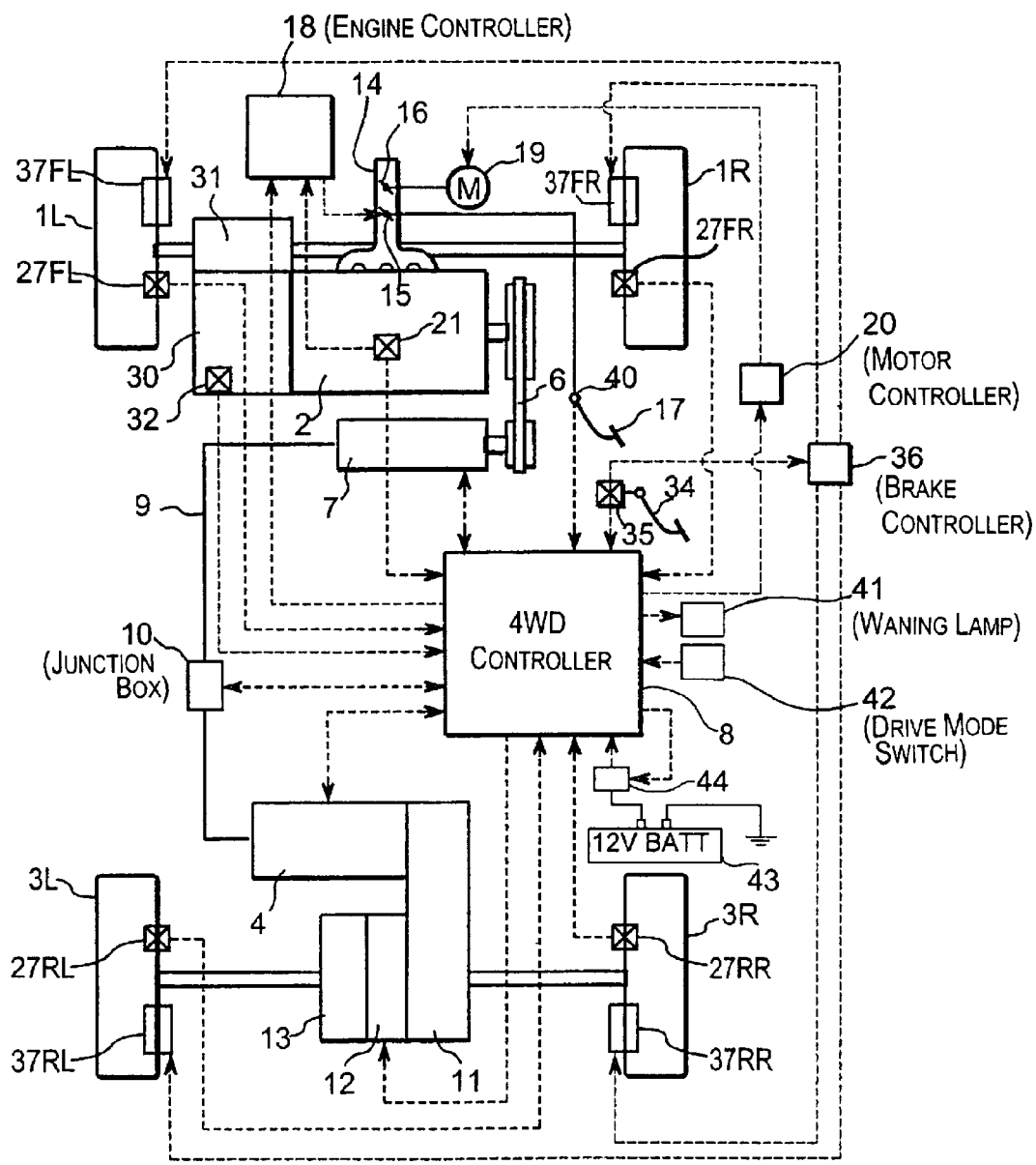
FIG. 1 is a schematic block diagram of a vehicle equipped with a vehicle driving force control apparatus in accordance with one embodiment of the present invention.

Referring initially to FIG. 1, a four wheel drive vehicle is diagrammatically illustrated that is equipped with a vehicle driving force control apparatus in accordance with a first embodiment of the present invention. As shown in FIG. 1, the vehicle in accordance with this embodiment has left and right front wheels 1L and 1R that are driven by an internal combustion engine or main drive source 2, and left and right rear wheels 3L and 3R that are driven by an electric motor or subordinate drive source 4. Thus, the front wheels 1L and 1R serve as the main drive wheels, while the rear wheels 3L and 3R serve as the subordinate drive wheels. An endless drive belt 6 transfers power from the internal combustion engine 2 to a generator 7, which supplies electrical energy to the electric motor 4.

The generator 7 rotates at a rotational speed Nh that is equal to the product of the rotational speed Ne of the internal combustion engine 2 and the pulley ratio of the endless drive belt 6. The load placed on the internal combustion engine 2 by the generator 7 due to the field current Ifh is adjusted by the 4WD controller 8 to generate a voltage corresponding to the load torque. The voltage generated by the generator 7 can be supplied to the electric motor 4 through the electrical line 9. A junction box 10 is provided at an intermediate point in the electrical line 9 between the electric motor 4 and the generator 7. The drive shaft of the electric motor 4 can be connected to the rear wheels 3L and 3R via a reduction gear 11, a clutch 12 and a differential gear 13.

Basically, in the vehicle driving force control apparatus of the present invention, as explained below, when it is estimated that the vehicle will stop from a traveling state, a transition time is estimated based on an estimate of the amount of time until the input shaft of the clutch 12 will stop and an estimate of the amount of time until the output shaft of the clutch 12 will stop, with both estimates being calculated while the vehicle is traveling. The clutch 12 is then connected after the transition time (which generally corresponds to the larger of the two aforementioned estimates) has elapsed. It is assumed that both the input shaft and the output shaft of the clutch 12 have completely stopped after the transition time has elapsed. As a result, it is possible to reliably connect the clutch 12 before the vehicle starts moving again (which is a time when four-wheel drive is often demanded) while avoiding the occurrence of shock when the clutch 12 connects.

These estimated amounts of time are assumed to be estimated based on values detected of the rear wheels 3L and 3R before it was estimated that the traveling vehicle would stop, i.e., before the vehicle reached a very low traveling speed. In short, the estimated amounts of time are assumed to be estimated based on detection values that are greater than or equal to a minimum detectable rotational speed. Consequently, if the fluctuations (external disturbances) of the traveling state are small from the time when it is estimated that the vehicle will stop until the time when the vehicle stops, it is possible to calculate an estimate of the amount of time until each shaft will stop with the required degree of accuracy. These estimated amounts of time are preferably estimated based on the rate of change (particularly the deceleration rate) in the rotation time.

A main throttle valve 15 and a sub throttle valve 16 are disposed inside the intake passage 14 (e.g., an intake manifold) of the internal combustion engine 2. The throttle opening of the main throttle valve 15 is adjusted/controlled in accordance with the amount of depression of the accelerator pedal 17, which also constitutes or functions as an accelerator position or sensor, or a throttle opening instructing device or sensor. In order to adjust the throttle opening of the main throttle valve 15, the main throttle valve 15 is either mechanically linked to the depression amount of the accelerator pedal 17, or adjusted/controlled electrically by an engine controller 18 in accordance with the depression amount detection value from an accelerator sensor 40 that detects the depression amount of the accelerator pedal 17 or the degree of opening of the main throttle valve 15. The depression amount detection value of the accelerator sensor 40 is outputted as a control signal to the 4WD controller 8. The accelerator sensor 40 constitutes an acceleration instruction sensor. The phrase "accelerator position opening degree" as used herein refers to either a throttle opening amount of the main throttle valve 15 or a depression amount of the accelerator pedal 17 or similar accelerator device. Thus, the phrase "accelerator position opening degree" as used herein refers to either a throttle opening amount of the main throttle valve 15 or a depression amount of the accelerator pedal 17 or similar accelerator device.

The sub throttle valve 16 uses a stepper motor 19 as an actuator for adjusting its throttle opening. Specifically, the throttle opening of the sub throttle valve 16 is adjusted/controlled by the rotational angle of the stepper motor 19, which corresponds to the step count. The rotational angle of the stepper motor 19 is adjusted/controlled by a drive signal from the motor controller 20. The sub throttle valve 16 is provided with a throttle sensor. The step count of the stepper motor 19 is feedback-controlled based on the throttle opening detection value detected by this throttle sensor. The output torque of the internal combustion engine 2 can be controlled (reduced) independently of the driver's operation of the accelerator pedal by adjusting the throttle opening of the sub throttle valve 16 so as to be smaller than the throttle opening of the main throttle valve 15.

The apparatus is also equipped with an engine rotational speed sensor 21 that detects the rotational speed of the internal combustion engine 2. The engine rotational speed sensor 21 outputs a control signal that is indicative of the engine rotational speed to the engine controller 18 and the 4WD controller 8.

As shown in the FIG. 1, the engine output torque Te of the internal combustion engine 2 is transferred to the left and right front wheels 1L and 1R through an automatic transmission 30 and a differential gear 31. A portion of the engine output torque Te of the internal combustion engine 2 is transferred to the generator 7 using the endless drive belt 6 to supply electrical energy to the electric motor 4.

The transmission 30 is provided with a shift position detector or sensor 32 that is configured and arranged to detect the current gear range of the transmission 30. The shift position detecting sensor 32 is configured and arranged to output or send a detected shift position signal indicative of the current gear range of the transmission 30 to a 4WD controller 8.

A brake pedal 34 that constitutes a brake instructing/operating section. The stroke amount of the brake pedal 34 is detected by a brake stroke sensor 35, which constitutes a brake operation amount sensor outputs the brake stroke amount it detects to a brake controller 36 and the 4WD controller 8.

The brake controller 36 controls the braking force acting on the vehicle by controlling the braking devices (e.g., disc brakes) 37FL, 37FR, 37RL and 37RR installed on the wheels 1L, 1R, 3L and 3R in response to the inputted brake stroke amount.

Figure 2:
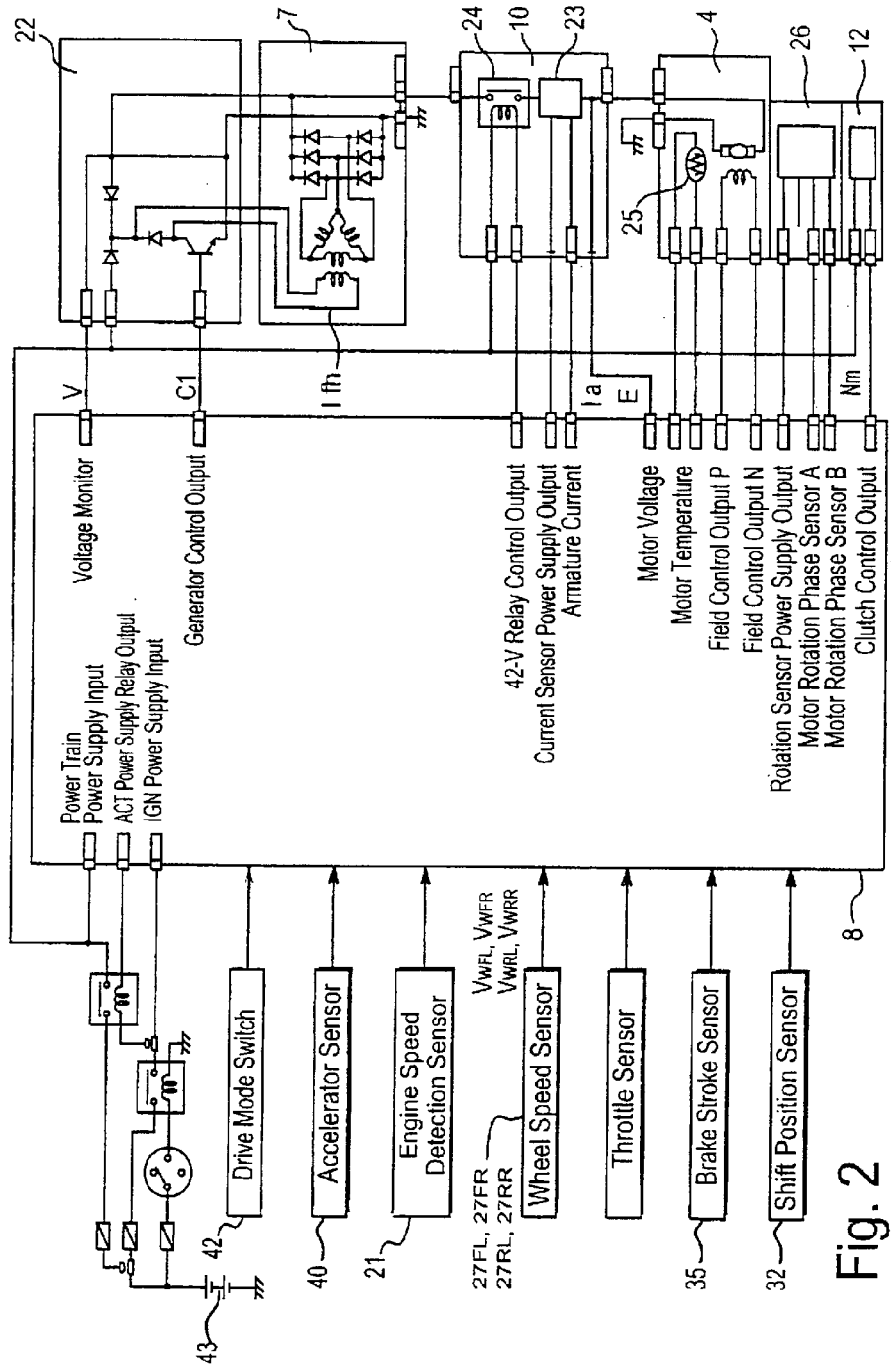
FIG. 2 is a block diagram showing a control system configuration for the vehicle driving force control apparatus illustrated in FIG. 1 in accordance with the illustrated embodiment of the present invention.

As shown in FIG. 2, the generator 7 is equipped with a voltage adjuster 22 (regulator) for adjusting the output voltage V. The 4WD controller 8 controls the generator load torque Th against the internal combustion engine 2 and the generated voltage V by adjusting the field current Ifh such as controlling a generator control command value c1 (duty ratio or field current value). The voltage adjuster 22 receives the generator control command value c1 (duty ratio or field current value) from the 4WD controller 8 and adjusts the field current Ifh of the generator 7 to a value corresponding to the generator control command value c1. The voltage adjuster 22 is also capable of detecting the output voltage V of the generator 7 and outputting the detected voltage value to the 4WD controller 8. Additionally, the rotational speed Nh of the generator 7 can be computed based on the rotational speed Ne of the internal combustion engine 2 and the pulley ratio of the endless drive belt 6.

A current sensor 23 is provided inside the junction box 10. The current sensor 23 detects the current value Ia of the electrical power supplied from the generator 7 to the electric motor 4 and outputs the detected armature current signal to the 4WD controller 8. The voltage value flowing through the electrical line 9 is detected by the 4WD controller 8 to produce a control signal indicative of the voltage across the electric motor 4. A relay 24 shuts off or connects the voltage (current) supplied to the electric motor 4 in accordance with a command from the 4WD controller 8.

A command from the 4WD controller 8 controls the field current Ifm of the electric motor 4 and the adjustment of the field current Ifm adjusts the drive torque Tm. A thermistor 25 measures the temperature of the electric motor 4 and produces a control signal indicative of the temperature of the electric motor 4.

The vehicle driving force control apparatus is also equipped with a motor rotational speed sensor 26 that detects the rotational speed Nm of the drive shaft of the electric motor 4. The motor rotational speed sensor 26 outputs a control signal indicative of the detected rotational speed of the electric motor 4 to the 4WD controller 8. The motor rotational speed sensor 26 constitutes an input shaft rotational speed detector or sensor.

The clutch 12 is a hydraulic clutch or electric clutch that connects and disconnects in response to a clutch control command issued from the 4WD controller 8. Thus, the clutch 12 transmits torque from the electric motor 4 to the rear wheels 3L and 3R at a torque transfer rate corresponding to the clutch control command from the 4WD controller 8.

The wheels 1L, 1R, 3L and 3R are provided with wheel speed sensors 27FL, 27FR, 27RL, and 27RR, respectively. Each speed sensor 27FL, 27FR, 27RL, and 27RR outputs a pulse signal corresponding to the rotational speed of the respective wheel 1L, 1R, 3L and 3R to the 4WD controller 8. Each of the pulse signals serves as a wheel speed detection value indicative of the he rotational speed of the respective wheel 1L, 1R, 3L and 3R, respectively. The wheel speed sensors 27RL and 27RR constitute an output shaft rotational speed detector or sensor.

The vehicle driving force control apparatus is also equipped with a drive mode switch 42 that allows the driver to manually select either a two-wheel (non-all wheel) drive mode or a four-wheel (all wheel) drive mode. The drive mode switch 42 is configured and arranged to output to the 4WD controller 8 a control signal that is indicative of the selected or designated drive mode to the 4WD controller 8. Thus, the 4WD controller 8 has a clutch connection command outputting section that is configured to output a clutch connection command 12 to connect the clutch 12 when the four-wheel drive mode has been designated. Thus, the drive mode switch 42 of the present invention constitutes part of a drive mode selection section that is configured to select one of a multi-wheel drive mode and a non-all wheel drive mode. When the present invention is utilized in vehicles equipped with more than four wheels or without an all wheel drive mode, the multi-wheel drive mode refers to a mode in which at least one of (main) drive wheel driven by a first (main) drive source is driven and at least one second (subordinate) drive wheel driven by a second (subordinate) drive source with a clutch disposed between the second drive wheel and the second drive source is driven. In this situation, a non-all wheel drive mode refers to a mode in which at least the clutch disconnects the second (subordinate) drive source from the second (subordinate) wheel.

A warning lamp 41 for clutch connection is arranged inside the passenger compartment. The warning lamp 41 either flashes or goes out (does not light) based on a signal from the 4WD controller 8 that indicates that a problem exists or not with the clutch connection.

A 12-volt battery 43 supplies operating electric power to the 4WD controller 8 with a 12-volt relay 44 is installed in the 12-volt electric power supply line thereof in order to connect and disconnect the power to the clutch 12, which is preferably an electromagnetic clutch.

Figure 3:
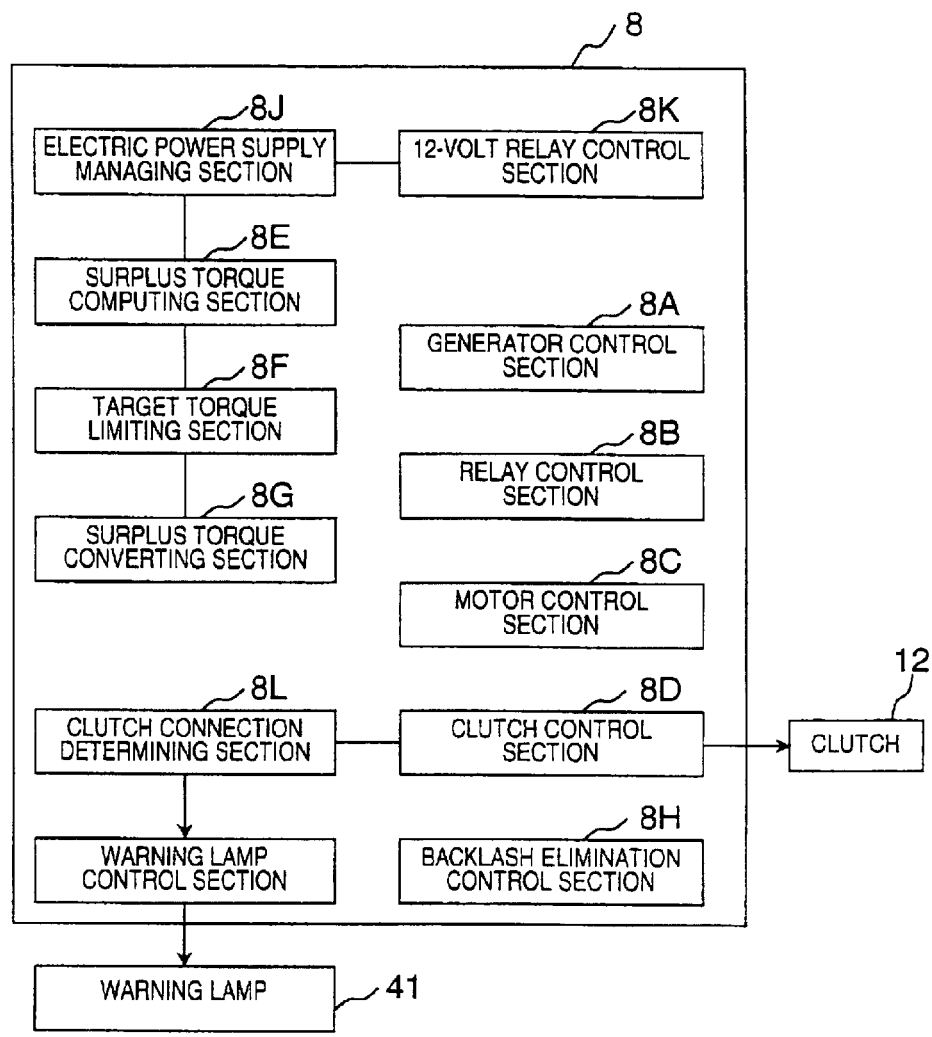
FIG. 3 is a block diagram showing the 4WD controller for the vehicle driving force control apparatus of the illustrated embodiment of the present invention.

As shown in FIG. 3, the 4WD controller 8 is equipped with a generator control section 8A, a relay control section 8B, a motor control section 8C, a clutch control section 8D, a surplus torque computing section 8E, a target torque limiting section 8F, a surplus torque converting section 8G, a backlash or play elimination control section 8H, an electric power supply managing section 8J, a 12-volt relay control section 8K, and a clutch connection determining section 8L. The clutch connection determining section 8L constitutes or includes an output shaft stop estimating section or device, an input shaft stop estimating section or device, and a clutch connection command outputting section or device.

The 12-volt relay control section 8K controls the 12-volt relay 44 in order to connect and disconnect the electrical power supplied from the 12-volt battery 43 to the 4WD controller 8, which distributes the electrical power to various components of the vehicle driving force control apparatus. The electric power supply managing section 8J, the surplus torque computing section 8E only operate when electrical power is supplied from the 12-volt battery 43. Of course, the other sections of the 4WD controller 8, with the exception of the 12-volt relay control section 8K, continue to operate even when the electrical power is disconnect from the 12-volt battery 43 to the 4WD controller 8.

Through the voltage adjuster 22, the generator control section 8A monitors the generated voltage V of the generator 7 and adjusts the generated voltage V of the generator 7 to the required voltage by adjusting the field current Ifh of the generator 7. Thus, the generator control section 8A includes a generation load torque adjusting section as discussed below. The relay control section 8B controls shutting off and connecting the power supply from the generator 7 to the electric motor 4. The motor control section 8C adjusts the field current Ifm of the electric motor 4 in order to adjust the torque of the electric motor 4 to the required value. The clutch control section 8D controls the state of the clutch 12 by outputting a clutch control command to the clutch 12.

Figure 4:
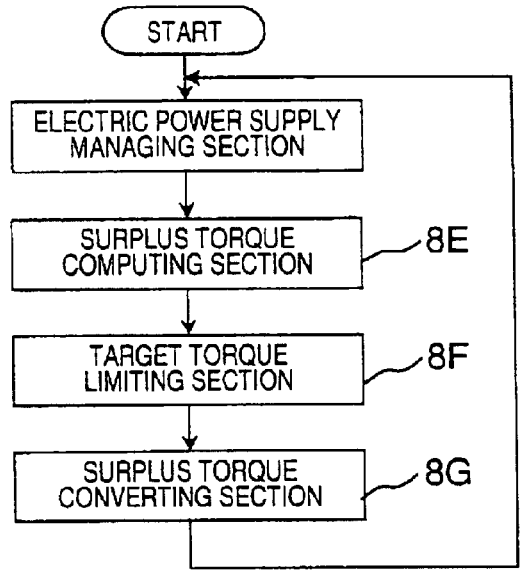
FIG. 4 is a flow chart showing the processing sequence executed by the 4WD controller for the vehicle driving force control apparatus illustrated in FIG. 1 of the illustrated embodiment of the present invention.

As shown in FIG. 4, at a prescribed sampling time cycle, the 4WD controller 8 executes the processing of the electric power supply managing section 8J, the surplus torque computing section 8E, the target torque limiting section 8F, and the surplus torque converting section 8G in sequence based on the input signals.

Figure 5:
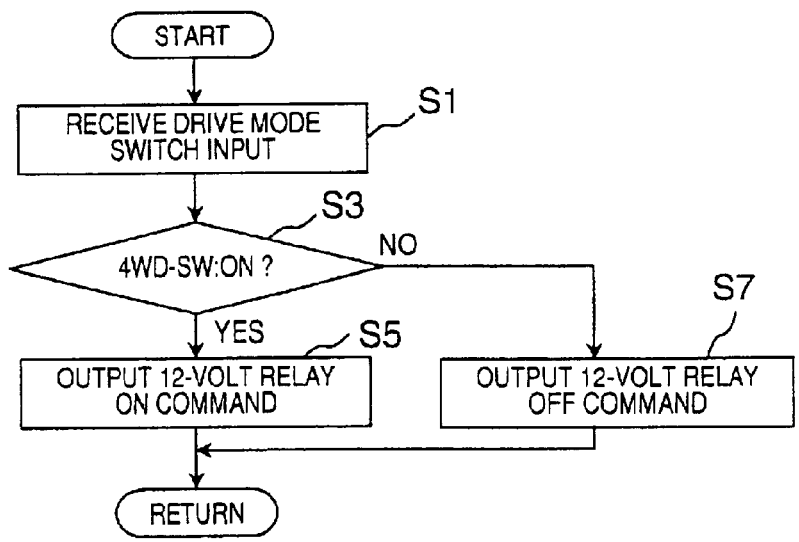
FIG. 5 is a flow chart showing the processing sequence executed by the power supply managing section for the vehicle driving force control apparatus illustrated in FIG. 1 of the illustrated embodiment of the present invention.

First, the processing shown in FIG. 5 is executed by the electric power supply managing section 8J. In step S1, mode information is received from the drive mode switch 42, while in step S3, the 4WD controller 8 determines if the vehicle is in four-wheel drive mode or in two-wheel drive mode. If the vehicle is in four-wheel drive mode, the 4WD controller 8 proceeds to step S5. If the vehicle is in two-wheel drive mode, the 4WD controller 8 proceeds to step S7.

In step S5, the 12-volt relay control section 8K outputs the 12-volt relay ON command such that electric power is supplied to activate the clutch 12 and the 4WD controller 8 returns to the beginning of the control loop. Meanwhile, in step S7, the 12-volt relay control section 8K outputs the 12-volt relay OFF command such that electric power is shut off and the 4WD controller 8 returns to the beginning of the control loop. When the electric power is shut off, the surplus torque computing section 8E does not execute any processing thereafter and output of command values to the generator 7 and motor 4 stops.

Figure 6:
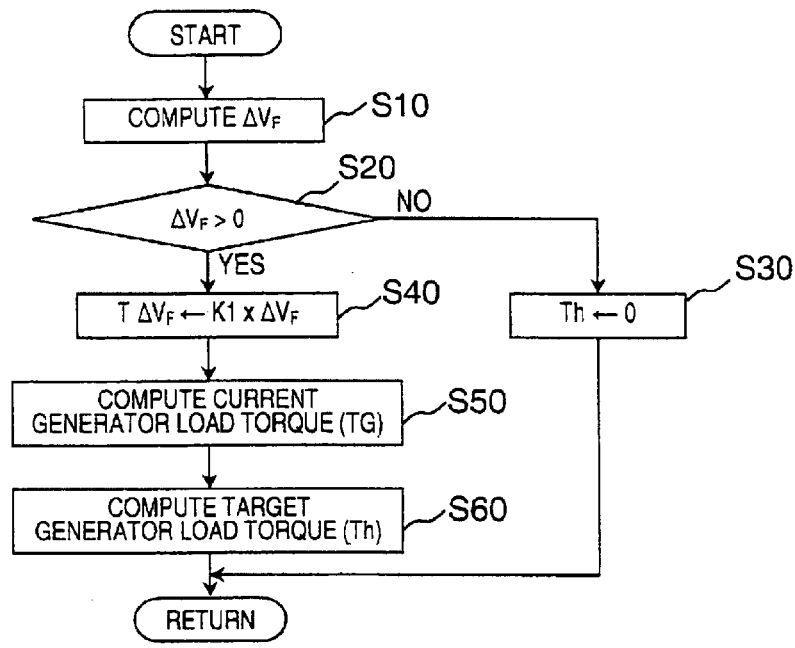
FIG. 6 is a flow chart showing the processing sequence executed by the surplus torque computing section for the vehicle driving force control apparatus illustrated in FIG. 1 of the illustrated embodiment of the present invention.

Next, the surplus torque computing section 8E will be discussed which executes the processing shown in FIG. 6. First, in step S10, the wheel speeds computed based on the signals from the wheel speed sensors 27FL, 27FR, 27RL and 27RR are used to subtract the wheel speed of the rear wheels 3L and 3R (subordinate drive wheels) from the wheel speed of the front wheels 1L and 1R (main drive wheels) and find the slippage speed $\Delta V_F$, which is the magnitude of the acceleration slippage of the front wheels 1L and 1R. Then, the 4WD controller 8 proceeds to step S20.

The slippage speed $\Delta V_F$ can be calculated as follows. The average front wheel speed $V_{Wf}$ (which is the average of the left and right wheel speeds for the front wheels 1L and 1R) and the average rear wheel speed $V_{Wr}$ (which is the average of the left and right wheel speeds for the rear wheels 3L and 3R) are calculated using the following two equations:

$$V_{Wf}=(V_{Wfl}+V_{Wfr})/2 \text{ and } V_{Wr}=(V_{Wrl}+V_{Wrr})/2.$$

Now, the slippage speed (acceleration slippage magnitude) $\Delta V_F$ of the front or main drive wheels 1L and 1R is calculated by the differential between the average front wheel speed $V_{Wf}$ and the average rear wheel speed $V_{Wr}$, as set forth in the following equation:

$$\Delta V_F = V_{Wf} - V_{Wr}$$

In step S20, the 4WD controller 8 determines whether or not the calculated slippage speed $\Delta V_F$ exceeds a prescribed value, such as zero. Thus, steps S10 and S20 constitute an acceleration slippage detection section that estimates if acceleration slippage is occurring in the front wheels 1L and 1R that is driven by the internal combustion engine 2. If slippage speed $\Delta V_F$ is determined to be zero or below, it is estimated that the front wheels 1L and 1R are not experiencing acceleration slippage and the 4WD controller 8 proceeds to step S30, where a target generator load torque Th is set to zero and the 4WD controller 8 returns to the beginning of the control loop.

Conversely, if in step S20 slippage speed $\Delta V_F$ is determined to be larger than zero, it is estimated that the front wheels 1L and 1R are experiencing acceleration slippage, and thus, control proceeds to step S40.

In step S40, the absorption torque $T\Delta V_F$ required for suppressing the acceleration slippage of the front wheels 1L and 1R is calculated using the equation below and the 4WD controller 8 proceeds to step S50. The absorption torque $T\Delta V_F$ is an amount that is proportional to the acceleration slippage magnitude, as set forth in the following equation:

$$T\Delta V_F = K1 \times \Delta V_F$$

where: K1 is a gain that is found through experimentation or the like.

In step S50, a current load torque TG of the generator 7 is calculated based on the equation below, and then the 4WD controller 8 proceeds to step S60.

$$TG = K2 \frac{V \times Ia}{K3 \times Nh}$$

where:

V: voltage of the generator 7,

Ia: armature current of the generator 7,

Nh: rotational speed of the generator 7,

K3: efficiency, and

K2: coefficient.

In step S60, the surplus torque, i.e., the target generator load torque Th that the generator 7 should impose, is found based on the equation stated below and the 4WD controller 8 returns to the beginning of the control loop.

$$Th = TG + T\Delta V_F.$$

Figure 7:
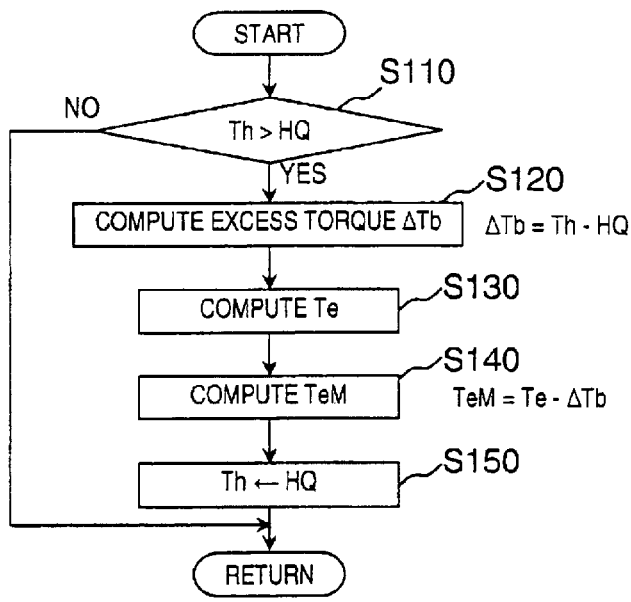
FIG. 7 is a flow chart showing the processing sequence executed by the target torque control section for the vehicle driving force control apparatus illustrated in FIG. 1 of the illustrated embodiment of the present invention.

Next, the processing executed by the target torque limiting section 8F will be explained based on FIG. 7. The processing of the target generator load torque Th in the flow chart of FIG. 7 constitutes a generator control section configured to control a generation load torque of the generator 7 to substantially correspond to an acceleration slippage magnitude of the drive wheel, when the acceleration slippage detection section estimates acceleration slippage occurring in the drive wheel.

First, in step S110, the target torque limiting section 8F of the 4WD controller 8 determines whether or not the target generator load torque Th is larger than the maximum load capacity HQ of the generator 7. The 4WD controller 8 proceeds to the beginning of the control program to repeat the processing if the 4WD controller 8 determines that target generator load torque Th is less than or equal to the maximum load capacity HQ of the generator 7. Conversely, the 4WD controller 8 proceeds to step S120 if the 4WD controller 8 determines that the target generator load torque Th is larger than the maximum load capacity HQ of the generator 7.

In step S120, the excess torque $\Delta Tb$, which is the portion of target generation load torque Th that exceeds the maximum load capacity HQ, is found according to the following equation: $\Delta Tb = Th - HQ$. Then, the 4WD controller 8 proceeds to step S130.

In step S130, the current engine torque Te is computed based on the signals from the engine rotational speed sensor 21 and the throttle sensor. Then, the 4WD controller 8 proceeds to step S140.

In step S140, the engine torque upper limit value TeM is calculated by subtracting the excess torque $\Delta Tb$ from the engine torque Te, as set forth in the following equation: $TeM = Te - \Delta Tb$. After the engine torque upper limit value TeM is outputted to the engine controller 18, the 4WD controller 8 proceeds to step S150.

In step S150, the maximum load capacity HQ is assigned as the target generation load torque Th, and then the 4WD controller 8 returns to the beginning of the control loop.

Figure 8:
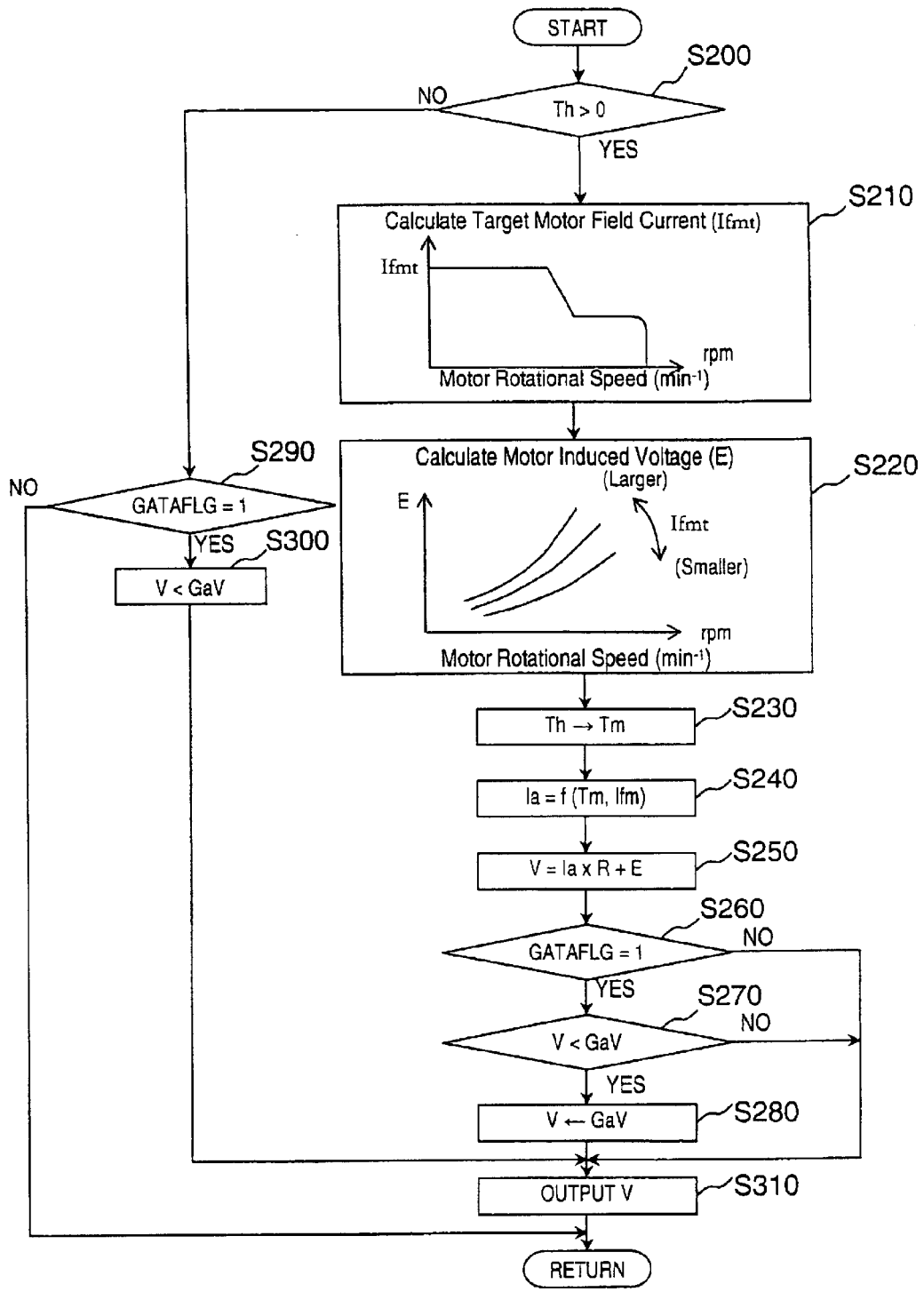
FIG. 8 is a flow chart showing the processing sequence executed by the surplus torque converting section for the vehicle driving force control apparatus illustrated in FIG. 1 of the illustrated embodiment of the present invention.

Next, the processing executed by the surplus torque converting section 8G of the 4WD controller 8 will be explained based on FIG. 8. First, in step S200, the 4WD controller 8 determines if the target generator load torque Th is larger than 0. If the target generator load torque Th is determined to be larger than 0, then the 4WD controller 8 proceeds to step S210 because the front wheels 1L and 1R are experiencing acceleration slippage. If the 4WD controller 8 determines that the target generator load torque Th is less than or equal to 0, then the 4WD controller 8 proceeds to step S290 because the front wheels 1L and 1R are not experiencing acceleration slippage.

In step S210, the rotational speed Nm of the electric motor 4 detected by the motor rotational speed sensor 26 is received as input signal. The target motor field current Ifm corresponding to the rotational speed Nm of the electric motor 4 is calculated and the target motor field current Ifm is outputted to the motor control section 8C. Then, the 4WD controller 8 proceeds to step S220.

The target motor field current Ifm corresponding to the rotational speed Nm of the electric motor 4 is held to a fixed prescribed current value when rotational speed Nm is below a prescribed rotational speed and the field current Ifm of the electric motor 4 is reduced by a known weak magnetic field control method when the electric motor 4 is rotating above a prescribed rotational speed. In short, when the electric motor 4 rotates at a high speed the motor torque decreases due to the rise in the motor induced voltage E. Therefore, as discussed earlier, when the rotational speed Nm of the electric motor 4 reaches or exceeds a prescribed value, the current flowing to the electric motor 4 is increased and the required motor torque Tm is obtained by reducing the field current Ifm of the electric motor 4 and lowering the motor induced voltage E. As a result, even if the electric motor 4 rotates at a high speed, the required motor torque Tm can be obtained because the motor induced voltage E is kept from rising and the motor torque is prevented from decreasing. Also, the price of the electronic control circuit can be reduced in comparison with continuous field current control because the motor field current Ifm is controlled in two stages: a stage for when the rotational speed is below a prescribed value and another stage for when the rotational speed is at or above a prescribed value.

It is also acceptable to provide a motor torque correcting section that continuously corrects the required motor torque Tm by adjusting the field current Ifm in accordance with the rotational speed Nm of the electric motor 4. That is, instead of switching between two stages, the field current Ifm of the electric motor 4 can be adjusted in accordance with the motor rotational speed Nm. As a result, even if the electric motor 4 rotates at a high speed, the required motor torque Tm can be obtained because the motor induced voltage E of the electric motor 4 is kept from rising and the motor torque is prevented from decreasing. Furthermore, since a smooth motor torque characteristic can be obtained, the vehicle can travel with better stability than in the case of two-stage control and the vehicle can always be kept in a state where the motor driving efficiency is good.

In step S220, the motor induced voltage E of the electric motor 4 is calculated based on the target motor field current Ifm and the rotational speed Nm of the electric motor 4. Then, the 4WD controller 8 proceeds to step S230.

In step S230, the corresponding target motor torque Tm is calculated based on the target generator load torque Th computed by the surplus torque computing section 8E. Then, the 4WD controller 8 proceeds to step S240.

In step S240, the corresponding target armature current Ia is calculated using the target motor torque TM and the target motor field current Ifm as variables. Then, the 4WD controller 8 proceeds to step S250.

In step 250, the target voltage V of the generator 7 is calculated based on the target armature current Ia, the resistance R, and the induced voltage E using the equation shown below. Then, the 4WD controller 8 proceeds to step S260.

$$V = Ia \times R + E$$

The resistance R used in this equation is the resistance of the electrical line 9 and the resistance of the coil of the electric motor 4.

In step S260, the 4WD controller 8 determines if the value of the backlash elimination flag GATAFLG is 1, i.e. if backlash elimination processing is being conducted. If the value of the backlash elimination flag GATAFLG is 1, then the 4WD controller 8 proceeds to step S270. If the value is 0, then the 4WD controller 8 proceeds to step S310.

In step S270 and step S280, the voltage V and the backlash elimination-purpose target voltage GaV are compared. If the backlash elimination-purpose target voltage GaV is larger, then the value of the backlash elimination-purpose target voltage GaV is assigned as the value of V and the 4WD controller 8 proceeds to step S310.

In step S310, the target voltage V of the generator 7 is outputted to the generator control section 8A, and the 4WD controller 8 then returns to the beginning of the control loop.

Meanwhile, if the target generator load torque Th was 0 in step S200, the 4WD controller 8 proceeds to step S290. If the backlash elimination flag GATAFLG is found to be 1 in step S290, i.e., if backlash elimination processing is being executed, then the 4WD controller 8 proceeds to step S300, where the value of the backlash elimination-purpose target voltage GaV is assigned to V, and the 4WD controller 8 then proceeds to step S310. Meanwhile, if the backlash elimination flag GATAFLG is found to be 0, i.e., if backlash elimination processing is not in progress, then the control loop ends and the 4WD controller 8 returns to the beginning.

The surplus torque converting section 8G calculates the target voltage V of the generator 7 in accordance with the target generator load torque Th, while taking into consideration the control of the electric motor 4. However, it is also acceptable to calculate the value of the target voltage V directly from the target generator load torque Th so as to achieve the target generator load torque Th.

Figure 9:
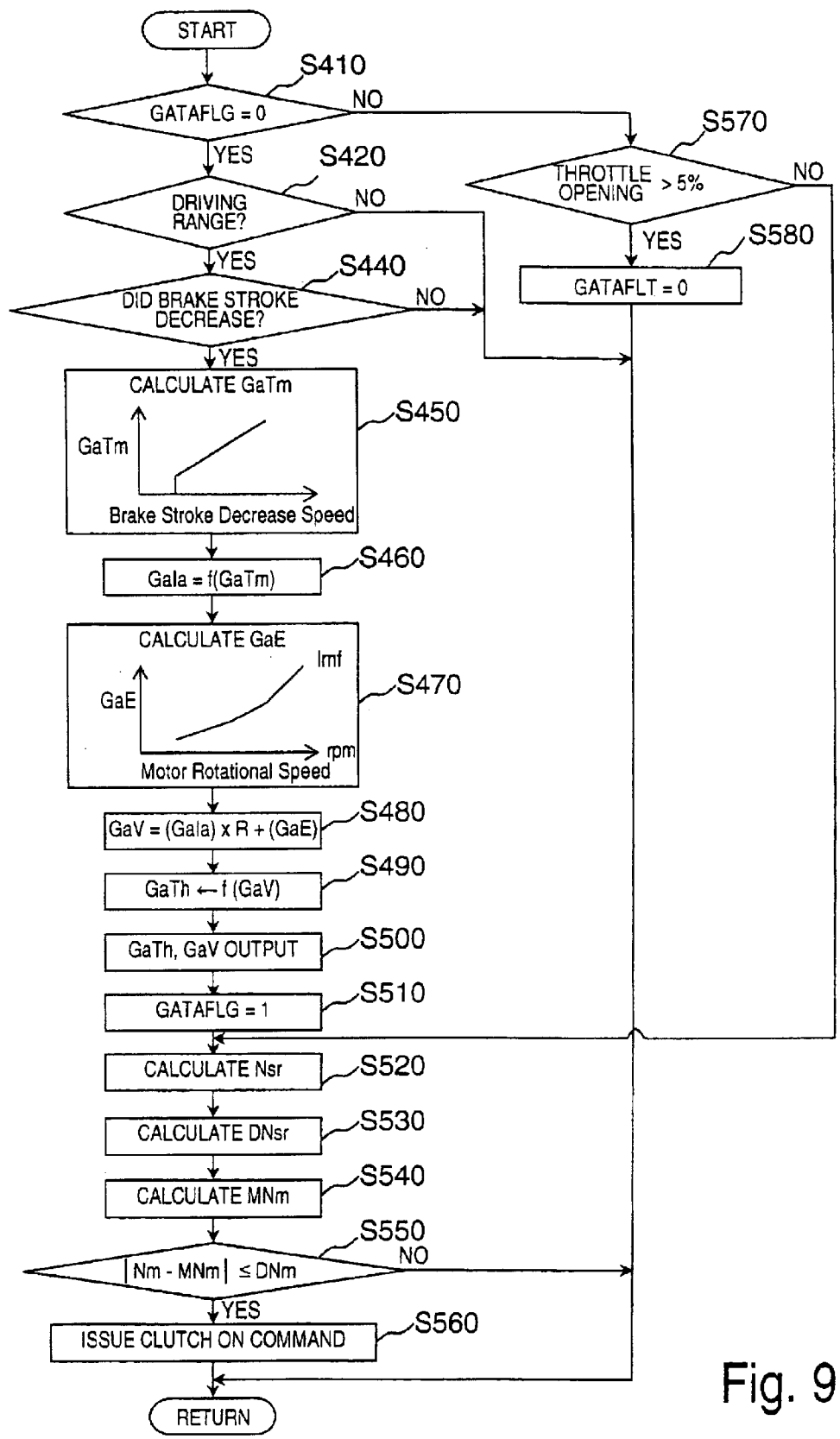
FIG. 9 is a flow chart showing the processing sequence executed by the backlash eliminating section for the vehicle driving force control apparatus illustrated in FIG. 1 of the illustrated embodiment of the present invention.

Next, the processing executed by the backlash eliminating section 8H will be explained. In accordance with a prescribed sampling time cycle, the backlash eliminating section executes the processing shown in FIG. 9 based on the input signals.

First, in step S410, the 4WD controller 8 determines if backlash elimination processing has started based on the backlash elimination flag GATAFLG. If the 4WD controller 8 determines that backlash elimination processing is not in progress, then the 4WD controller 8 proceeds to step S420. If it is determined that backlash elimination processing is in progress, then the 4WD controller 8 proceeds to step S570.

In step S420, the 4WD controller 8 determines if the transmission 30 is in a drive range (D, R, 1, or 2) based on the shift position detector or sensor 32. If the 4WD controller 8 determines that the transmission 30 is in a drive range, i.e., that torque is being transmitted from the internal combustion engine 2 to the front wheels 1L and 1R, then the 4WD controller 8 proceeds to step S440. Conversely, if the 4WD controller 8 determines that the transmission 30 is not in a drive range, then the control loop ends and the 4WD controller 8 returns to the beginning.

In step S440, based on the signal from the brake stroke sensor 35, it is determined if the brake pedal 34 is moving in a release direction, i.e., moving in the direction of decreasing brake instruction or command. If so, the 4WD controller 8 proceeds to step S450. If not, the control loop ends and the 4WD controller 8 returns to the beginning. It is also acceptable to determine if the brake pedal 34 has been released and proceed to step S450 if so, or end and return the processing if not.

In step S450, the 4WD controller 8 finds the change in the release amount (i.e., decrease speed) of the brake stroke based on the signal from the brake stroke sensor 35, and calculates the backlash elimination-purpose target motor torque GaTm corresponding to the decrease speed using a preset map or mathematical function. Then, the 4WD controller 8 proceeds to step S470. In this embodiment, the backlash elimination-purpose target motor torque GaTm is set to a value proportional to the decreased speed amount when the decreased speed amount is greater than or equal to a prescribed value. However, it is also acceptable to keep the backlash elimination-purpose target motor torque GaTm fixed irregardless of the decreased speed amount.

In step S460, the corresponding target armature current GaIa to be used for eliminating backlash is calculated using the backlash elimination-purpose target motor torque GaTm as a variable. Then, in step S470, the induced voltage GaE of the electric motor 4 is calculated based on the rotational speed Nm of the electric motor 4 and the motor field current Imf, which has been fixed at a prescribed value. Then, the 4WD controller 8 proceeds to step S480. If the backlash elimination control is only executed when the vehicle is starting to move from a stop, it is acceptable to ignore the fluctuations in the induced voltage GaE of the electric motor 4 and execute the processing using a fixed value for (i.e., without calculating) the induced voltage GaE.

In step S480, the backlash elimination-purpose target voltage GaV of the generator 7 is calculated, and in step S490, the corresponding target generator load torque GaTh is calculated using the target voltage GaV as a variable. In step 500, the calculated values are outputted and the 4WD controller 8 proceeds to step S510.

In step S510, the backlash elimination flag GATAFLG is set to 1 and the 4WD controller 8 proceeds to step S520. Setting the backlash elimination flag GATAFLG to 1 causes the surplus torque converting section 8G to process the motor torque in accordance with the outputted target voltage GaV and the target generator load torque GaTh. In short, since backlash elimination processing is in progress, the electric motor 4 is drive-controlled and generates a very small torque after the clutch 12 is connected.

In step 520, the rotational speeds of the axles of the rear wheels (which are the subordinate drive wheels) 3L and 3R are found and used to find the rotational speed of the clutch output shaft based on the gear ratio of the differential. Then, the converted output shaft rotational speed Nsr of the clutch output shaft is calculated. This converted output shaft rotational speed Nsr is the rotational speed of the clutch output shaft converted to the rotational speed at the position of the output shaft of the electric motor 4. Then, the 4WD controller 8 proceeds to step S530. It is also acceptable to detect the rotational speed of the clutch output shaft directly and use the detected value as the rotational speed of the clutch output shaft.

In step S530, the 4WD controller 8 calculates the weighted average of the regularly acquired converted output shaft rotational speed Nsr and calculates the average rate of change DNsr of the converted output shaft rotational speed Nsr. Then, the 4WD controller 8 proceeds to step S540. The average rate of change DNsr is a value that corresponds to the rotational acceleration of the clutch output shaft.

In step S540, the target rotational speed MNm is calculated using the equation below and the 4WD controller 8 proceeds to step S550.

$$MNm = Nsr + Nmofs + DNsr \times GDV$$

Thus, the target rotational speed MNm is larger than the converted output shaft rotational speed Nsr of the clutch output shaft by a prescribed rotational speed difference Nmofs that is corrected by an average rate of change DNsr that corresponds to the rotational acceleration of the clutch output shaft multiplied by a constant value GDV.

The prescribed rotational speed difference Nmofs is a constant that is found through experimentation or the like, and that is set to a value that prevents shock caused by torque fluctuations when the clutch 12 connects from being transmitted to the passengers in the vehicle or suppresses such shock to such a degree that it does not bother the passengers. When the clutch 12 connects, there is backlash that needs to be eliminated between the clutch 12 and the subordinate drive wheels 3L and 3R. Consequently, torque fluctuations associated with the clutch 12 are not recognized as shock so long as they are small. Furthermore, it is also acceptable to make the prescribed rotational speed difference Nmofs a variable that is, for example, inversely proportional to the rotational speed of the electric motor 4 or the rotational speed of the clutch output shaft.

The value GDV in the previous equation is a constant that serves to convert the average rate of change DNsr into a value corresponding to the response delay of the clutch operation (i.e., a constant that serves to convert the average rate of change into the amount by which the converted output shaft rotational speed Nsr increases or decreases during the response delay period of the clutch 12). In other words, due to the response delay of the clutch operation, it is anticipated that the larger the average rate of change DNsr is, the larger will be the amount by which the rotational speed of the clutch output shaft exceeds the aforementioned detected value when the clutch 12 actually connects. This amount is corrected with the value DNsr×GDV.

Next, in step S550, the 4WD controller 8 determines if the difference between the motor rotational speed Nm and the target rotational speed MNm is within a prescribed range of a prescribed correction amount DNm. If the difference is within the prescribed range of the prescribed correction amount DNm, the 4WD controller 8 proceeds to step S560. If the difference exceeds the prescribed range of the prescribed correction amount DNm, the control loop ends and returns to the beginning.

$$|Nm - MNm| \leq DNm$$

The value of the prescribed correction amount DNm should be set in view of the control error amount. It is also acceptable to correct the prescribed correction amount DNm based on the rotational acceleration ΔNm (rate of change of the rotational speed) of the electric motor 4 (e.g., add an amount corresponding to ΔNm). In other words, the larger the rotational acceleration ΔNm of the electric motor 4 is, the larger the value of the prescribed correction amount DNm is set in anticipation of overshooting of the motor rotational speed Nm during the response delay of the clutch operation, thus achieving the same effect as reducing the value of the target rotational speed MNm. Since the effect is the same as directly correcting the target rotational speed MNm in accordance with the rotational acceleration ΔNm of the electric motor 4, it is also acceptable to correct the target rotational speed MNm in accordance with the rotational acceleration ΔNm of the electric motor 4 instead of varying the prescribed correction amount DNm in accordance with the rotational acceleration ΔNm of the electric motor 4. In this latter case, a value obtained by multiplying the rotational acceleration ΔNm of the electric motor 4 by an experimentally determined coefficient should be subtracted from the target rotational speed MNm. Furthermore, the same effect as is achieved by correcting the target rotational speed MNm directly using the average rate of change DNsr can also be achieved by changing the value of the prescribed correction amount DNm in accordance with the average rate of change DNsr.

In step S560, the clutch control section 8D connects the clutch 12. Then, the control loop ends and returns to the beginning.

Meanwhile, if the backlash elimination processing is determined to be in progress in step S410, the 4WD controller 8 proceeds to step S570.

In step S570, the 4WD controller 8 finds the throttle opening (acceleration instruction amount) based on the signal from the accelerator sensor 40 and determines if the throttle opening is greater than 5%. If the throttle opening is greater than 5%, then the 4WD controller 8 proceeds to step S580, where the backlash elimination flag GATAFLG is set to 0 and the control loop ends and returns to the beginning. If the throttle opening is determined to be less than or equal to 5% in step S570, then the 4WD controller 8 proceeds to step S520 and the clutch 12 is connected if it is not already connected.

Figure 10:
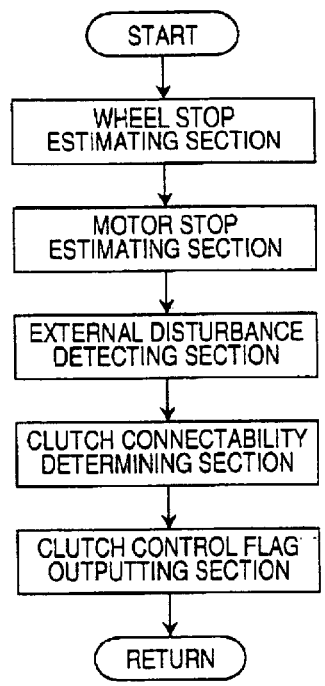
FIG. 10 is a flow chart showing the processing sequence executed by the clutch connection determining section for the vehicle driving force control apparatus illustrated in FIG. 1 of the illustrated embodiment of the present invention.

Now the processing executed by the clutch connection determining section 8L will be described. In accordance with a prescribed sampling time cycle (e.g., 10 milliseconds), the clutch connection determining section 8L executes its processing through the following sections in order as shown in FIG. 10: a wheel stop estimating section, a motor stop estimating section, an external disturbance detecting section, a clutch connectability determining section, and a clutch connection flag outputting section.

Figure 11:
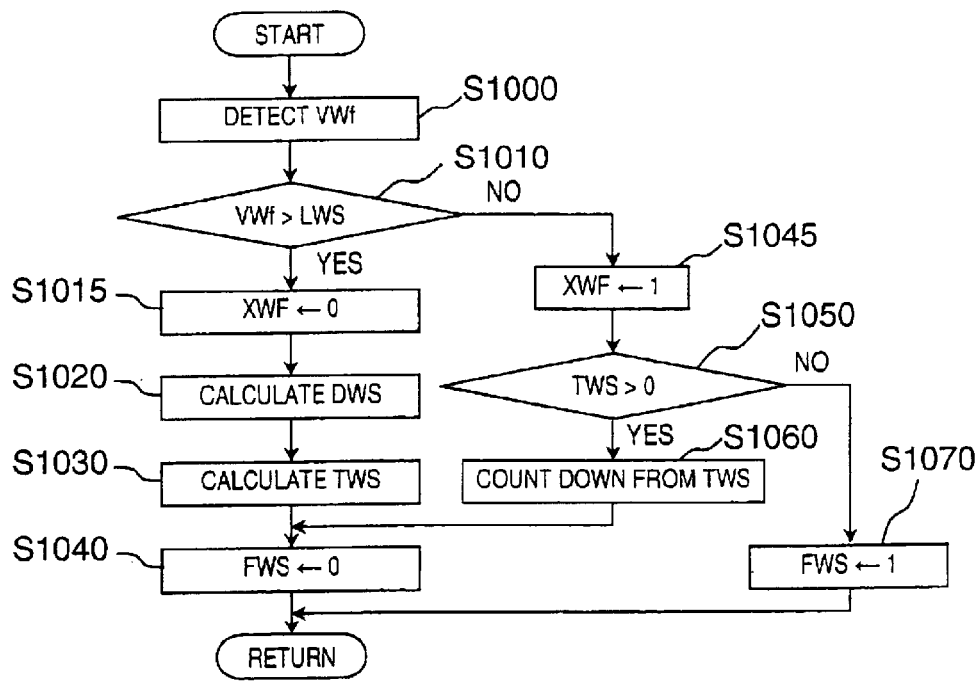
FIG. 11 is a flow chart showing the processing sequence executed by the wheel stop estimating section for the vehicle driving force control apparatus illustrated in FIG. 1 of the illustrated embodiment of the present invention.

The wheel stop estimating section executes the processing shown in FIG. 11. In step S1000, the controller finds the average wheel speed $V_{wf}$ of the rear wheels based on signals from the rear wheel speed sensors 27RL and 27RR and then proceeds to step S1010.

In step S1010, the 4WD controller 8 determines if the average wheel speed $V_{wf}$ of the rear wheels is larger than a minimum detectable rotational speed LWS, which corresponds to the lowest speed that can be detected with the detection precision of the wheel speed sensors 27RL and 27RR. If it is determined that the average wheel speed $V_{wf}$ is larger than the minimum detectable rotational speed LWS, then the 4WD controller 8 proceeds to step S1015. Meanwhile, if the average wheel speed $V_{wf}$ is less than or equal to the minimum detectable rotational speed LWS, the 4WD controller 8 proceeds to step S1045. Step S1010 preferably constitutes a vehicle stop determining section that determines that the vehicle has stopped rotating if the output rotational speed value of the output part or shaft of the clutch 12 falls below the minimum detectable rotational speed LWS for the output shaft stop rotational speed sensor, e.g., the wheel speed sensors 27RL and 27RR.

In step S1015, the value 0 is assigned to a flag XWF that determines whether or not the average wheel speed $V_{wf}$ of the rear wheels 3L and 4L is less than or equal to the minimum detectable rotational speed LWS. Then, the 4WD controller 8 proceeds to step S1020.

In step S1020, the 4WD controller 8 computes the wheel rotational speed change rate DWS using the equation shown below and proceeds to step S1030.

$$DWS=(VWf_n+VWf_{n-1}+VWf_{n-2})/3-(VWf_{n-3}+VWf_{n-4}+VWf_{n-5})/3$$

The subscripts n-m indicate that the value was detected during the $m^{th}$ previous processing cycles. Thus, the subscript n indicates that the value was detected in the current processing cycle. The same notation applies hereinafter.

In this embodiment, the values from six processing cycles are used and the wheel rotational speed change rate DWS is calculated by finding the difference between averages of those values, but the invention is not limited to such a method. It is also acceptable to calculate the wheel rotational speed change rate DWS using values from two cycles using the expression $(VWf_n-VWF_{n-1})$, but it is more difficult for noise to affect the calculation when the change rate is found using values from six cycles as explained above.

In step S1030, the 4WD controller 8 calculates the required wheel stopping time estimate value TWS using the equation below and proceeds to step S1040.

$$TWS=[VWfn/(-1\times DWS)]-TWD-30 \text{ (ms)}$$

Since the wheel rotational speed change rate DWS is defined to be positive when the change rate is in the direction of increasing speed, it is multiplied by −1 here to obtain a positive value because the change rate is in the direction of decreasing speed (deceleration).

In the above equation, the value TWD is the response delay time of the rear wheel speed sensors 27RL, 27RR and the 30 ms is the phase delay time caused by the computation executed in step S1020. In this embodiment, corrections are made for the response delay of the wheel speed sensors 27RL and 27RR and the phase delay of the aforementioned computation. It is also acceptable to correct for the response delay of the clutch operation.

In step S1040, the value 0 is assigned to the wheel rotation stop estimation flag FWS to indicate that the wheels 3L and 3R are not in the stopped state.

Meanwhile, if the average wheel speed $V_{wf}$ is found to be less than or equal to the minimum detectable rotational speed LWS in step S1010, the 4WD controller 8 proceeds to step S1045 where it assigns the value 1 to the flag XWF. Then, in step S1050, the 4WD controller 8 determines if the required wheel stopping time estimate value TWS is larger than 0. If the value is larger than 0, the 4WD controller 8 determines that the rear wheels 3L and 3R have not yet stopped and proceeds to step S1060. If the value is less than or equal to 0, the 4WD controller 8 determines that the rear wheels 3L and 3R have stopped and proceeds to step S1070.

In step S1060, the 4WD controller 8 counts down the required wheel stopping time estimate value TWS, i.e., subtracts the length of one processing cycle (e.g., 10 ms) from the TWS value computed in the previous cycle. Then, the 4WD controller 8 proceeds to step S1040.

In step S1070, the value 1 is assigned to the wheel rotation stop estimation flag FWS to indicate that the rear wheels 3L and 3R are in the stopped state and then the 4WD controller 8 returns to the beginning of the control loop.

The steps S1020 and S1030 constitute an output shaft stop estimating section or device of the 4WD controller 8. The output shaft stop estimating section of the 4WD controller 8 is configured such that a detected first parameter that is preferably a first amount of time that is an estimated of time for the rotation of the output part or output shaft to stop rotating based on the output rotational speed value received from the output rotational speed sensor, e.g., the wheel speed sensors 27RL and 27RR.

Figure 12:
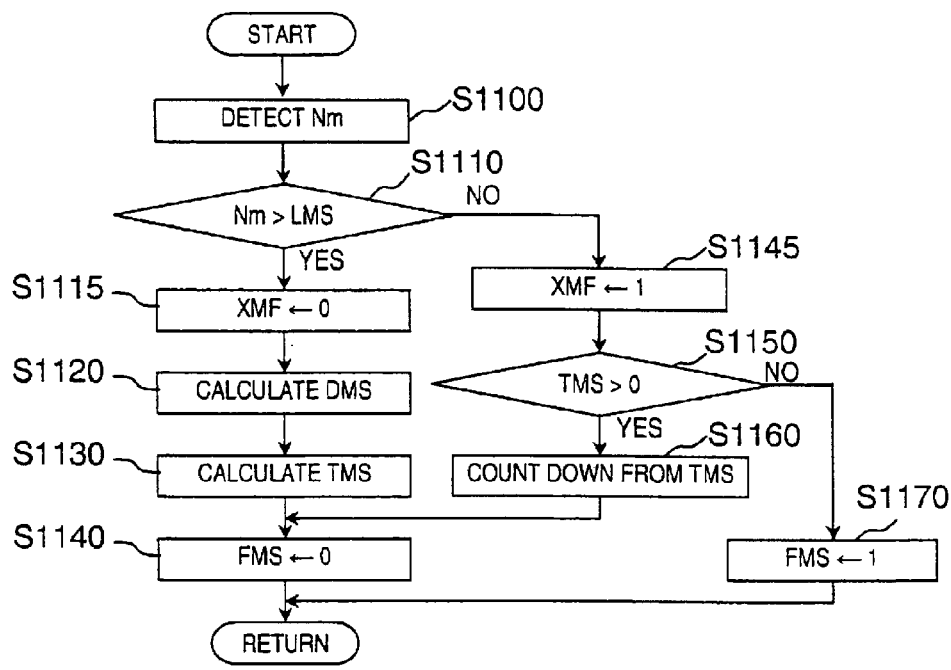
FIG. 12 is a flow chart showing the processing sequence executed by the motor stop estimating section for the vehicle driving force control apparatus illustrated in FIG. 1 of the illustrated embodiment of the present invention.

Next, as shown in FIG. 12, the motor stop estimating section executes processing similar to that executed by the wheel stop estimating section. In step S1100, the 4WD controller 8 finds the motor rotational speed Nm based on the signal from the motor rotational speed sensor 26 and then proceeds to step S1110.

In step S1110, the 4WD controller 8 determines if the motor rotational speed Nm is larger than a minimum detectable rotational speed LMS, which corresponds to the lowest speed that can be detected with the detection precision of the motor rotational speed sensor 26. If it is determined that the motor rotational speed Nm is larger than the minimum detectable rotational speed LMS, then the 4WD controller 8 proceeds to step S1115. Meanwhile, if the motor rotational speed Nm is less than or equal to the minimum detectable rotational speed LMS, the 4WD controller 8 proceeds to step S1145 where it assigns the value 1 to the flag XMF.

In step S1115, the value 0 is assigned to a flag XMF that determines whether or not the motor rotational speed Nm is less than the minimum detectable rotational speed LMS. Then, the 4WD controller 8 proceeds to step S1120.

In step S1120, the 4WD controller 8 computes the motor rotational speed change rate DMS using the equation shown below and then proceeds to step S1130.

$$DMS=(Nm_n+Nm_{n-1}+Nm_{n-2})/3-(Nm_{n-3}+Nm_{n-4}+Nm_{n-5})/3$$

The subscripts n-m indicate that the value was detected during the $m^{th}$ previous processing cycle. Thus, the subscript n indicates that the value was detected in the current processing cycle. The same notation applies hereinafter.

In this embodiment, values from six processing cycles are used and the motor rotational speed change rate DMS is calculated by finding the difference between averages of those values. The invention, however, is not limited to such a method. It is also acceptable to calculate the motor rotational speed change rate DMS using values from two cycles using the expression $(Nm_n-Nm_{n-1})$, but it is more difficult for noise to affect the calculation when the change rate is found using values from six cycles as explained above.

In step S1130, the 4WD controller 8 calculates the required motor stopping time estimate value TMS using the equation below and proceeds to step S1140.

$$TMS=[Nm_n/(-1\times DMS)]-TMD-30 \text{ (ms)}$$

Since the motor rotational speed change rate DMS is defined to be positive when the change rate is in the direction of increasing speed, it is multiplied by −1 here to obtain a positive value because the change rate is in the direction of decreasing speed (deceleration).

In the above equation, the value TMD is the response delay time of the motor rotational speed sensor 26 and the 30 ms is the phase delay time caused by the computation executed in step S1120. In this embodiment, corrections are made for the response delay of the motor rotational speed sensor 26 and the phase delay of the aforementioned computation. It is also acceptable to correct for the response delay of the clutch operation.

In step S1140, the value 0 is assigned to the motor rotation stop estimation flag FMS to indicate that the electric motor 4 is not in the stopped state.

Meanwhile, if the motor rotational speed Nm is found to be less than or equal to the minimum detectable rotational speed LMS in step S1110, the 4WD controller 8 proceeds to step S1150 and determines if the required motor stopping time estimate value TMS is larger than 0. If the value is larger than 0, the 4WD controller 8 determines that the electric motor 4 has not yet stopped and proceeds to step S1160. If the value is less than or equal to 0, the 4WD controller 8 determines that the electric motor 4 has stopped and proceeds to step S1170.

In step S1160, the 4WD controller 8 counts down the required motor stopping time estimate value TMS, i.e., subtracts the length of one processing cycle (e.g., 10 ms) from the TMS value computed in the previous cycle. Then, the 4WD controller 8 proceeds to step S1140.

In step S1170, the value 1 is assigned to the motor rotation stop estimation flag FMS to indicate that the electric motor 4 is in the stopped state, and then the 4WD controller 8 returns to the beginning of the control loop.

The steps S1120 and S1130 constitute an input shaft stop estimating section or device. The input shaft stop estimating section of the 4WD controller 8 is configured such that a detected second parameter that is preferably a second amount of time that is an estimated of time for the rotation of the input part or input shaft to stop rotating based on the input rotational speed value received from the input rotational speed sensor, e.g., motor rotational speed sensor 26.

Figure 13:
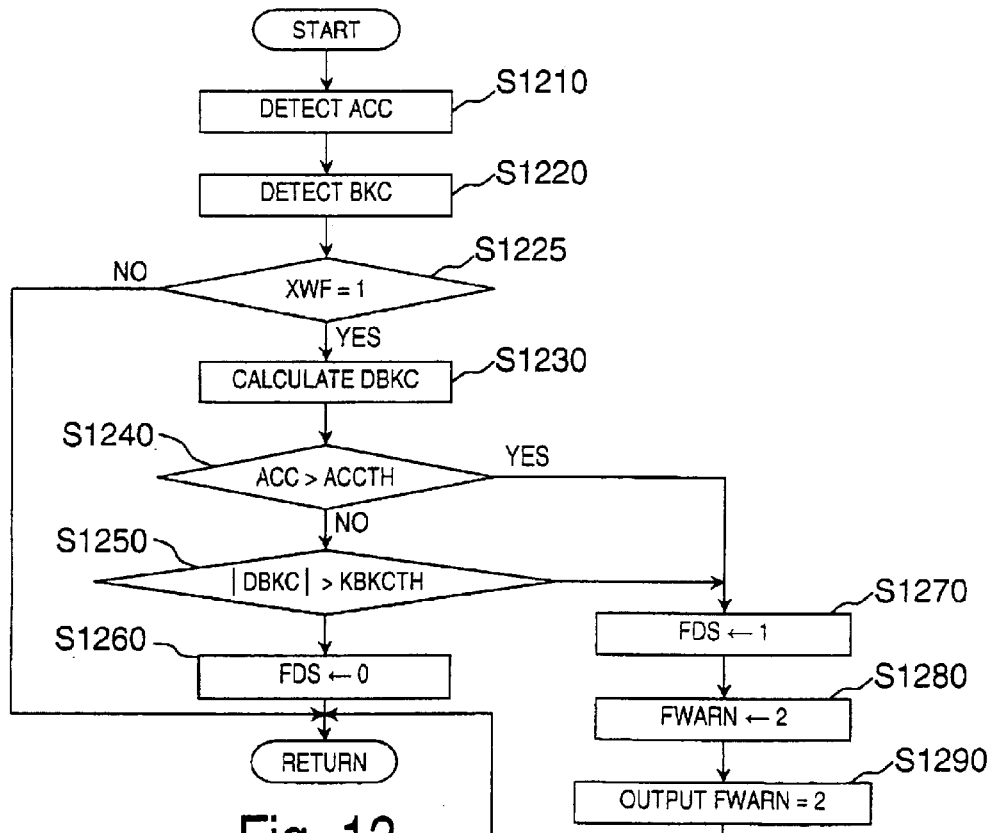
FIG. 13 is a flow chart showing the processing sequence executed by the external disturbance detecting section for the vehicle driving force control apparatus illustrated in FIG. 1 of the illustrated embodiment of the present invention.

Next, the processing executed by the external disturbance detecting section is explained based on FIG. 13. In this embodiment, the external disturbance detecting section executes processing to detect accelerator operations, brake operations, and other external disturbances that will change the stop time of the wheels.

First, in step S1210, the 4WD controller 8 finds the accelerator operation amount ACC based on the signal from the accelerator sensor 40 and then proceeds to step S1220.

In step S1225, the 4WD controller 8 determines if the value of XWF is 1, i.e., if required wheel stopping time estimate value TWS is being counted down. If so, the 4WD controller 8 proceeds to step S1230. If XWF is not 1, the 4WD controller 8 returns to the beginning of the loop.

In step S1230, the 4WD controller 8 calculates the brake operation amount change rate DBKC based on the equation shown below and then proceeds to step S1240.

$$DBKC = (BKC_n + BKC_{n-1} + BKC_{n-2}) - (BKC_{n-3} + BKC_{n-4} + BKC_{n-5})$$

In step S1240, the 4WD controller 8 determines if the accelerator was operated, i.e., if the accelerator operation amount ACC is larger than a prescribed value ACCTH (e.g., 5%). If it is larger, the 4WD controller 8 proceeds to step S1270. If it is not larger, the 4WD controller 8 proceeds to step S1250. The prescribed value ACCTH is a threshold value above which it is assumed that the traveling state of the vehicle is changing (experiencing external disturbance).

In step S1250, the 4WD controller 8 determines if the absolute value of the brake operation change rate DBKC is larger than the brake operation amount threshold value DBKCTH. If the absolute value is larger than the brake operation amount threshold value DBKCTH, then the 4WD controller 8 proceeds to step S1270. If the absolute value is not larger than the brake operation amount threshold value DBKCTH, then the 4WD controller 8 proceeds to step S1260.

In step S1260, the 4WD controller 8 sets the external disturbance detection flag FDS to 0 to indicate that there are no external disturbances. Then, the 4WD controller 8 returns to the beginning of the control loop.

Meanwhile, if it is determined that the allowable external disturbance has been exceeded, then the 4WD controller 8 proceeds to step S1270, sets the external disturbance flag FDS to 1, and proceeds to step S1280.

In step S1280, since and external disturbance exists, the 4WD controller 8 assigns the value 2 to the warning lamp status flag FWARN to request the warning lamp to flash and thereby inform the driver that the clutch 12 will not be connected during a temporary stop. Then, in step S1290, the 4WD controller 8 outputs the fact that the warning lamp status flag FWARN has a value of 2 or that the FWARN has changed to the warning lamp control section 8M and the control loop ends.

The warning lamp control section 8M controls the warning lamp 41 in accordance with the warning lamp status flag FWARN. More specifically, when it detects that the value of the warning lamp status flag FWARN has changed to 2, the warning lamp control section 8M causes the warning lamp 41 to flash. Meanwhile, when it detects that the value of the warning lamp status flag FWARN has changed to 1, the warning lamp control section 8M turns the warning lamp 41 off.

Figure 14:
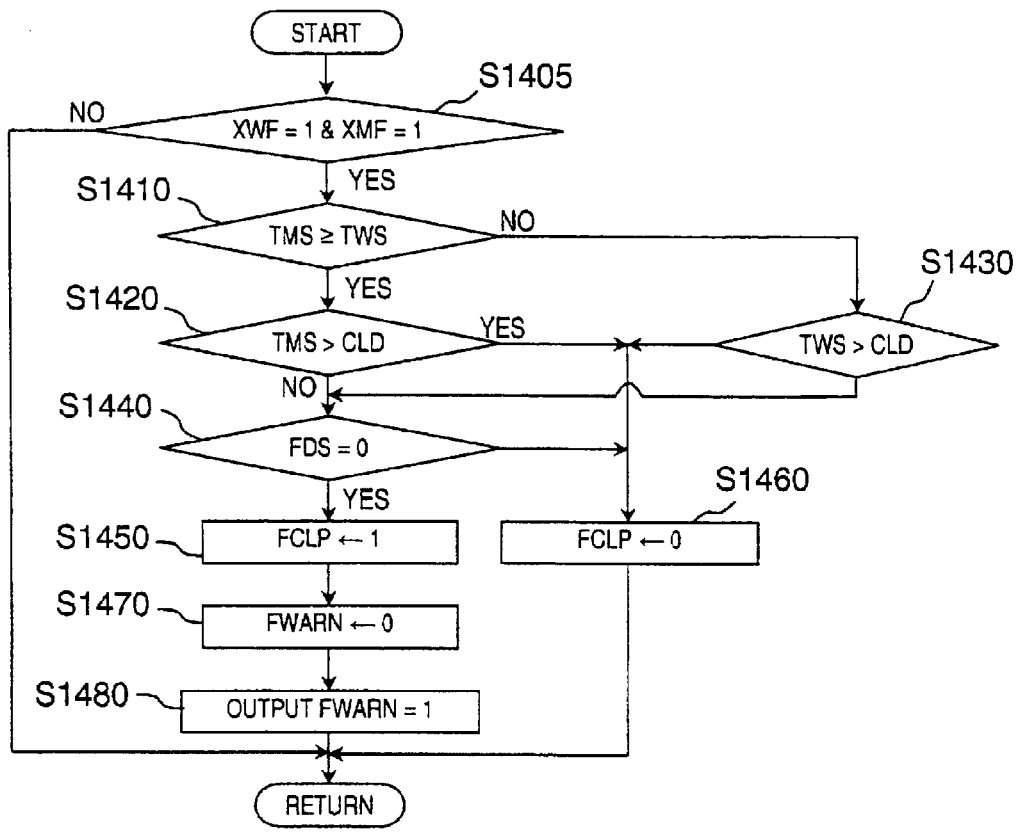
FIG. 14 is a flow chart showing the processing sequence executed by the clutch connectability determining section for the vehicle driving force control apparatus illustrated in FIG. 1 of the illustrated embodiment of the present invention.

Next, the clutch connectability determining section will be described based on FIG. 14. Basically, FIG. 14 is a flow chart showing the processing sequence executed by the clutch connectability determining section for the vehicle driving force control apparatus illustrated in FIG. 1 of the illustrated embodiment of the present invention. The clutch connectability determining section includes a clutch stop determining section that is configured to determine that the clutch has stopped rotating based on a determination of the occurrences of the detected output and input parameters, the first and second amounts of time estimated by the output and input shaft stop estimating sections.

First, the 4WD controller 8 determines if the both the flag XWF and the flag XMF have a value of 1. If both flags have a value of 1, the 4WD controller 8 proceeds to step S1410. If not, the 4WD controller 8 returns to the beginning of the control loop. In step S1410, the 4WD controller 8 compares the required motor stopping time estimate value TMS and the required wheel stopping time estimate value TWS. If the required motor stopping time estimate value TMS is larger, then the 4WD controller 8 proceeds to step S1420. If the required wheel stopping time estimate value TWS is larger, then the 4WD controller 8 proceeds to step S1430.

In step S1420, the 4WD controller 8 determines if the required motor stopping time estimate value TMS is larger than the clutch response delay time CLD. If so, the 4WD controller 8 proceeds to step S1460. If the estimate value is less than or equal to the clutch response delay time CLD, then the 4WD controller 8 proceeds to step S1440.

Similarly, in step S1430, the 4WD controller 8 determines if the required wheel stopping time estimate value TWS is larger than the clutch response delay time CLD. If so, the 4WD controller 8 proceeds to step S1460. If the estimate value is less than or equal to the clutch response delay time CLD, then the 4WD controller 8 proceeds to step S1440.

In step S1440, the 4WD controller 8 determines if the value of the external disturbance detection flag FDS is 0, i.e., if the vehicle is free from external disturbances exceeding the tolerance. If so, the 4WD controller 8 proceeds to step S1450. Conversely, if the external disturbance detection flag FDS is not 0, the 4WD controller 8 proceeds to step S1460.

In step S1450, the 4WD controller 8 assigns the value 1 to the clutch connectability flag FCLP and proceeds to step S1470, where it sets the warning lamp status flag FWARN to 0, i.e., changes the warning light status information to off. Then, in step S1480, the 4WD controller 8 outputs the fact that the warning lamp status flag FWARN is 0 to the warning lamp control section before returning to the beginning of the control loop.

Figure 15:
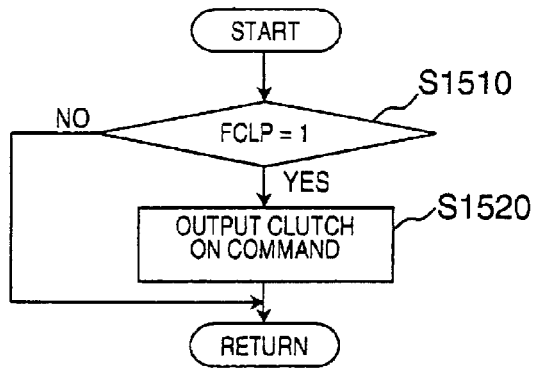
FIG. 15 is a flow chart showing the processing sequence executed by the clutch control flag outputting section for the vehicle driving force control apparatus illustrated in FIG. 1 of the illustrated embodiment of the present invention.

Next, the processing executed by the clutch control flag outputting section will be explained based on FIG. 15. First, the 4WD controller 8 determines if the value of the clutch connectability flag FCLP is 1. If the value of the clutch connectability flag FCLP is determined to be 1, then the 4WD controller 8 proceeds to step S1520 and outputs the clutch ON command to the clutch 12 via the clutch control section 8D.

Meanwhile, if the value of the clutch connectability flag FCLP is not 1, the clutch control section of the 4WD controller 8 returns to the beginning of the control loop, leaving the clutch connection status as is. In other words, if the clutch 12 is connected it is left connected, and if the clutch 12 is not connected it is left unconnected.

Next, the processing executed by the engine controller 18 will be described.

Figure 16:
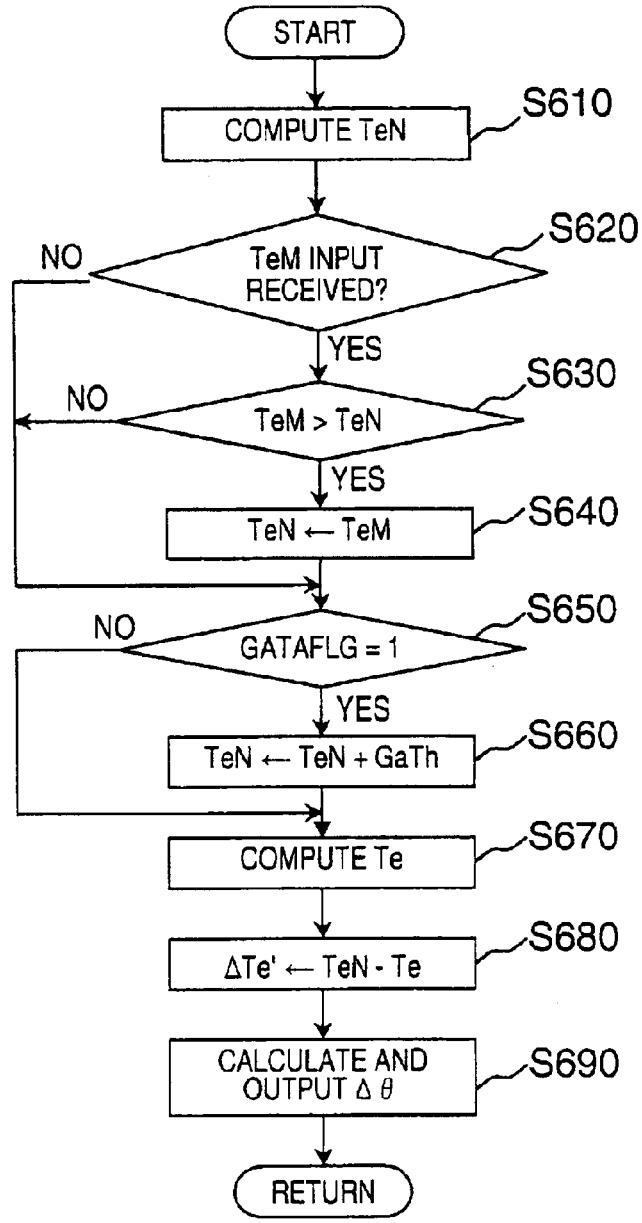
FIG. 16 is a flow chart showing the processing sequence executed by the engine controller for the vehicle driving force control apparatus illustrated in FIG. 1 of the illustrated embodiment of the present invention.

In accordance with a prescribed sampling time cycle, the engine controller 18 executes the processing show in FIG. 16 based on the input signals.

In step S610, the engine controller 18 computes the target output torque TeN requested by the driver based on the detection signal from the accelerator sensor 40 and then proceeds to step S620.

In step S620, the engine controller 18 determines if the output torque upper limit TeM has been received from the 4WD controller 8. If it is determined that the output torque limit has been received, the engine controller 18 proceeds to step S630. Otherwise, the engine controller 18 proceeds to step S650.

In step S630, the engine controller 18 determines if the output torque upper limit TeM is larger than the target output torque TeN. If the output torque upper limit TeM is larger, the engine controller 18 proceeds to step S640. Meanwhile, if the output torque upper limit TeM is smaller than or equal to the target output torque TeN, the engine controller 18 proceeds to step S650.

In step S640, the engine controller 18 assigns the value of the output torque upper limit TeM to as the target output torque TeN, thereby increasing the target output torque TeN, and proceeds to step S650.

In step S650, the engine controller 18 determines if the value of the backlash elimination flag GATAFLG is 1, i.e., if backlash elimination processing is in progress. If backlash elimination processing is determined to be in progress, the engine controller 18 proceeds to step S660. If backlash elimination processing is determined not to be in progress, the control program of the engine controller 18 proceeds to step S670.

In step S660, the engine controller 18 increases the target output torque TeN which is increased by the amount of the backlash elimination-purpose target load torque GaTh and proceeds to step S670.

In step S670, the engine controller 18 calculates the current output torque Te based on the throttle opening, the engine speed, etc., and then proceeds to step S680.

In step S680, the engine controller 18 calculates the deviation $\Delta Te'$ of the target output torque TeN from the current output torque Te using the equation shown below and then proceeds to step S690.

$$\Delta Te' = TeN - Te$$

In step S690, the engine controller 18 calculates a change $\Delta\theta$ in the throttle opening $\theta$ in accordance with the deviation $\Delta Te'$ and outputs a throttle opening signal corresponding to the throttle opening change amount $\Delta\theta$ to the stepper motor 19. Then the engine controller 18 returns to the beginning of the control loop.

Now the operation of the vehicle driving force control apparatus constituted as described heretofore will be described.

The following explanation assumes the designated drive mode is set to the four-wheel drive mode. The clutch 12 is not connected when the designated drive mode is set to the two-wheel drive mode.

When the torque transferred from the internal combustion engine 2 to the front wheels 1L and 1R is larger than the road surface reaction force limit torque, i.e., when acceleration slippage occurs in the front wheels 1L and 1R (which are the main drive wheels 1L and 1R), due to the road surface friction coefficient $\mu$ being small or the driver depressing the accelerator pedal 17 too deeply, the drive torque transferred to the front wheels 1L and 1R is controlled so as to approach the road surface reaction force limit torque of the front wheels 1L and 1R by having the generator 7 generate at a generator load torque Th corresponding to the magnitude of the acceleration slippage. As a result, acceleration slippage of the front wheels 1L and 1R (which are the main drive wheels) is suppressed.

Furthermore, the acceleration performance of the vehicle is improved because the surplus electric power generated by the generator 7 is used to drive the electric motor 4, which drives the rear wheels 3L and 3R (which are the subordinate drive wheels).

Since the electric motor 4 is driven by the surplus torque that exists in excess of the road surface reaction force limit torque of the main drive wheels 1L and 1R, the energy efficiency is improved, which leads to improved fuel consumption.

In a case where the rear wheels 3L and 3R are always driven, several energy conversions (mechanical energy→electrical energy→mechanical energy, etc.) take place and energy losses occur in accordance with the conversion efficiencies. Therefore, the acceleration performance of the vehicle declines in comparison with a case where only the front wheels 1L and 1R are driven. Consequently, it is preferred that driving of the rear wheels 3L and 3R be generally suppressed. Conversely, this embodiment takes into consideration the fact that when traveling on a slippery road surface or the like, even if all of the output torque Te of the engine 2 is transferred to the front wheels 1L and 1R, not all of the torque will be used as driving force. The driving force that cannot be utilised efficiently by the front wheels 1L and 1R is outputted to the rear wheels 3L and 3R and the acceleration performance is improved.

Additionally, in this embodiment, when the brake pedal 34 is released from a depressed condition in order to accelerate the vehicle while traveling, the 4WD controller 8 calculates a target voltage GaV for the electric motor 4 in accordance with a backlash elimination-purpose target motor torque GaTm that is proportional to the stroke speed of the brake pedal 34 when it is initially released. As a result, the electric motor 4 generates a very small torque while the clutch 12 is connected. The very small torque, which is not sufficient to drive the rear wheels 3L and 3R (subordinate drive wheels), acts on the torque transfer path between the electric motor 4 and the rear wheels 3L and 3R and functions to eliminate any backlash (play) existing among the mechanisms (i.e., the reduction gear 11, the clutch 12, and the differential gear 13) comprising the torque transfer path.

Afterwards, when acceleration slippage occurs at the front wheels 1L and 1R and the vehicle enters the four-wheel drive state, the backlash has already been eliminated as just described. Consequently, not only is the occurrence of shock resulting from backlash in the power transmission system prevented, but also the response of the rear wheels 3L and 3R to being driven by the electric motor 4 is improved because the backlash in the power transmission system has already been eliminated before the motor 4 starts driving the rear wheels 3L and 3R. In short, the response of the vehicle when it shifts into the four-wheel drive mode is improved. Then, when the motor torque for the four-wheel drive mode becomes larger than the small motor torque GaTh, the actual motor torque will be the motor torque for four-wheel drive mode.

If the speed of the brake pedal 34 is fast when it is initially released, it is highly likely that the accelerator pedal 17 will be depressed and acceleration will commence, i.e., the transition to the four-wheel drive mode will be executed early. In this embodiment, the faster the speed of the initially released brake pedal 34 is, the larger the value to which the very small torque GaTh of the motor 4 is set. As a result, the brake release speed is faster, backlash is eliminated earlier so that earlier transition to the four-wheel drive mode can be accommodated.

Even if the internal combustion engine 2 is in a driving state, it is not always necessary to eliminate the backlash, i.e., when the vehicle is in a non-driving range in which the output torque of the internal combustion engine 2 is not transmitted to the main drive wheels, i.e., the front wheels 1R and 1L. Therefore, the generation of unnecessary small torque is avoided in step S420 by preventing the execution of backlash elimination processing. In other words, wasting of electric energy is prevented by preventing the generation of a small electric current by the generator 7. Moreover, it is also acceptable to design the control program such that, even if backlash prevention is in progress, the 4WD controller 8 determines if the vehicle is in a driving range in step S540, for example, and, if the vehicle is in a non-driving range, the 4WD controller 8 proceeds to step S550 and stops the backlash elimination.

Backlash elimination is also stopped when the throttle opening exceeds a prescribed amount (e.g., 5% as in step S570). Although it is acceptable to set the prescribed throttle opening to 0%, in a case where acceleration slippage occurs and the vehicle shifts into the four-wheel drive mode slightly after the vehicle begins to move, it is possible that backlash will develop during the initial small amount of vehicle movement even though the backlash was eliminated in advance. Therefore, in the embodiment, the prescribed amount was set to 5%, which is the approximate throttle opening expected to exist when the accelerator pedal 17 has been depressed slightly and the vehicle either starts moving or starts to undergo acceleration slippage. Thus, it is generally preferred to set the prescribed throttle opening to an amount that approximates the throttle opening expected to exist when the accelerator pedal 17 has been depressed slightly and the vehicle either starts moving or starts to undergo acceleration slippage.

Moreover, when the clutch 12 is connected in order to execute backlash elimination, the clutch 12 is in such a state that the clutch input shaft (which is rotated by the electric motor 4) is rotating faster than the clutch output shaft by a prescribed rotational speed difference Nmofs. Thus, the backlash elimination can be completed early after the clutch 12 is connected and the acceleration is substantially free of a feeling of deficiency can be achieved when the vehicle shifts to a four-wheel drive mode.

This is in contrast with conventional control methods in which the clutch 12 is connected under such conditions that the rotational speed difference between the clutch input shaft and the clutch output shaft is zero. With such conventional control methods, the torque is increased gradually after the clutch is connected because the torque is substantially zero immediately after the clutch is connected. Consequently, strong acceleration of the subordinate drive wheels cannot be achieved and a feeling of speed loss occurs.

Moreover, with the present invention, although the clutch 12 experiences a response delay from when the clutch connection command is outputted until the clutch 12 actually connects, the difference between the rotational speed of the clutch output shaft and the rotational speed of the clutch input shaft is kept within a prescribed range when the clutch 12 actually connects by correcting the target rotational speed MNm in accordance with the rotational acceleration of the clutch output shaft. As a result, the torque fluctuation that occurs when the clutch 12 is connected can be held within the targeted range without influencing the acceleration state of the vehicle, regardless of whether the vehicle is traveling at a very low rate of acceleration or a high rate of acceleration.

Also, if the rotational acceleration $\Delta Nm$ of the electric motor 4 is large, the motor rotational speed Nm will be larger than the detected value when the clutch actually connects. However, similarly to the response delay just described, the rotational acceleration of the electric motor 4 can be prevented from exerting an adverse effect and the torque fluctuation that occurs when the clutch 12 is connected can be held within the targeted range by making corrections in accordance with the rotational acceleration $\Delta Nm$ of the electric motor 4.

Since the processing just described in relation to connecting the clutch 12 is particularly effective when the vehicle proceeds immediately into the four-wheel drive mode after the backlash is eliminated, it is also acceptable to arrange for the processing to be executed when an accelerator switch turns ON, serving as a prediction of four-wheel drive mode. Another feasible option is to execute the processing of steps S520 to S550 (clutch connection timing control) only when the vehicle is traveling at or above a prescribed speed.

In the preceding explanations, the motor drive control was the same before and after connection of the clutch 12 during backlash elimination processing. However, it is also acceptable to use different motor drive control methods before and after the connection of the clutch. For example, before connecting the clutch 12, the electric motor 4 could be controlled by power control whereby the electric motor 4 is supplied with a fixed level of power (electric power). In such an arrangement, the motor torque would decrease as the rotational speed Nm of the electric motor 4 increased, thus making it possible to effectively suppress torque fluctuations when the clutch 12 is connected.

When the speed of the vehicle decreases to a very low speed corresponding to the minimum rotational speed that the wheel speed sensors 27RL and 27RR can accurately detect and it is estimated that the vehicle will stop, the driving force control apparatus computes the required motor stopping time estimate value TMS (which is an estimate of the time required for the rotation of the electric motor 4 to stop, i.e., for the input shaft of the clutch 12 to stop) and the required wheel stop time estimate value TWS (which is an estimate of the time required for the rotation of the rear wheels 3L and 3R to stop, i.e., for the output shaft of the clutch 12 to stop) using a deceleration value based on the detection results of the wheel speed sensors 27RL and 27RR up to the point in time when the very low speed was reached. Since the connection command is sent to the clutch 12 when the larger of the required motor stopping time estimate value TMS and the required wheel stopping time estimate value TWS has elapsed, the clutch 12 is connected under conditions where both the input shaft and output shaft of the clutch 12 have definitely stopped and the occurrence of shock when the clutch is connected can be suppressed.

When the times for the electric motor 4 and the rear wheels 3L and 3R to stop rotating are estimated, the values of the required motor stopping time estimate value TMS and the required wheel stopping time estimate value TWS are made more accurate by taking into account the response delay time of the sensors and the phase delay of the computations. Furthermore, wasted time before connecting the clutch 12 is eliminated by taking into account the operation response delay of the clutch 12 and issuing the clutch connection command before the electric motor 4 or rear wheels 3L and 3R have actually stopped completely.

When the clutch connection is executed in this manner, the clutch 12 is already connected before the vehicle starts moving in cases where the vehicle starts moving from a stopped condition. Consequently, the vehicle has good response to the transition to the four-wheel drive and the vehicle can be provided with the required starting performance and acceleration performance.

Thus, when the vehicle is in the four-wheel drive mode, the clutch 12 is generally connected in advance when starting into motion from a stop, which is a time when acceleration slippage occurs easily. However, it is also acceptable to execute the previously described backlash elimination processing when starting into motion from a stop, thus preventing shock caused by backlash in the drive train when the vehicle is first starting into motion. Also, since the clutch 12 is connected in advance, it is not necessary to execute clutch connection processing.

When the vehicle decelerates, passes the very low speed, and stops briefly before starting into motion again, it might be assumed that in some cases the electric motor 4 will be rotating in an unloaded state during the brief stop of the vehicle. With this embodiment, in cases where the vehicle starts into motion before the rotation of the electric motor 4 stops, the clutch 12 is connected while the vehicle is stopped and the occurrence of shock when the clutch 12 is connected is avoided.

Another possible scenario is that after the vehicle reaches the very low speed and it is estimated that the vehicle will stop, the driver will depress the accelerator and request acceleration before the electric motor 4 and the wheels 3L and 3R stop rotating. In such a case, it is highly probable that the electric motor 4 or wheels 3L and 3R will not be in a stopped state when the estimated stopping time has elapsed because the traveling conditions of the vehicle will have changed and the required wheel stopping time estimate value TWS will no longer accurate. Therefore, in such a case, output of the clutch connection command is stopped and the occurrence of shock caused by connection of the clutch 12 is prevented.

Since, as just described, it is possible that the clutch 12 will not be connected when the vehicle stops, it is also acceptable to design the driving force control apparatus such that, when the vehicle starts moving, it determines if the clutch 12 is connected and, if the clutch 12 is not connected, executes backlash elimination control.

Similarly, another possible scenario is that after the vehicle reaches the very low speed and it is estimated that the vehicle will stop, the driver will operate the brake and change the braking force acting on the vehicle before the electric motor 4 and the wheels 3L and 3R stop rotating. In such a case, it is highly probable that the electric motor 4 or wheels 3L and 3R will not be in a stopped state when the estimated stopping time has elapsed because the traveling conditions of the vehicle will have changed and the required wheel stopping time estimate value TWS will no longer accurate. Therefore, in such a case, output of the clutch connection command is stopped and the occurrence of shock caused by connection of the clutch 12 is prevented. Moreover, it is also acceptable to execute this processing only in cases where the brake pedal 34 is operated in the brake release direction such that the braking force becomes smaller. This is acceptable because if, conversely, the brake pedal 34 is depressed further and the braking force becomes larger, it can be estimated that the rotation will stop earlier than the stopping time estimate value, i.e., the rotation of the rear wheels 3L and 3R will already have stopped when the estimated stopping time finishes elapsing.

When the vehicle is in the two-wheel drive mode and the vehicle speed is below the very low speed, operation of the accelerator pedal 17 or brake pedal 34 will have no effect on the required motor stopping time estimate value TMS if the clutch 12 is in the disconnected state.

Figure 17:
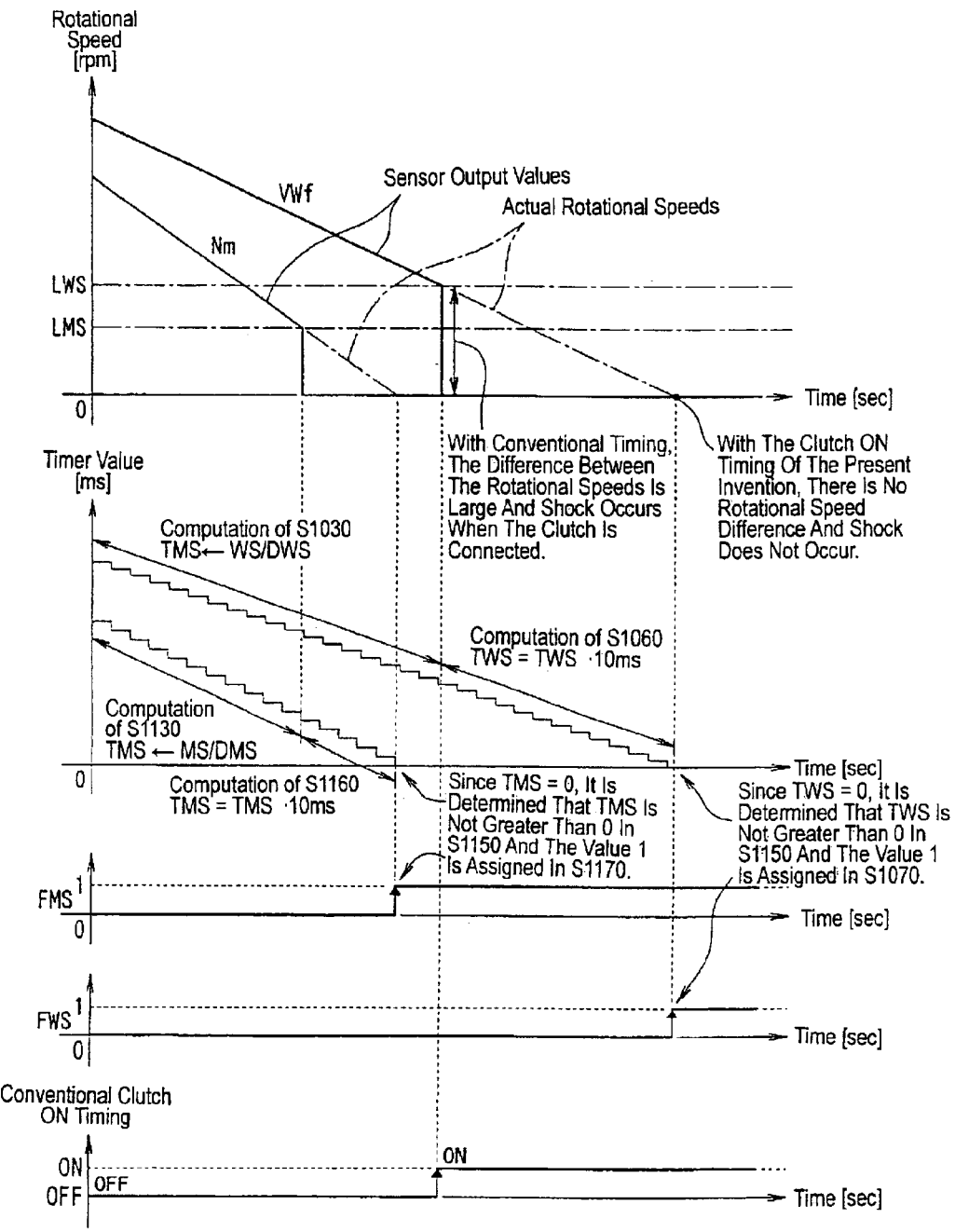
FIG. 17 are timing charts that illustrate the rotation stop timing estimation executed the rotation stop timing estimation section for the vehicle driving force control apparatus illustrated in FIG. 1 of the illustrated embodiment of the present invention.
Figure 18:
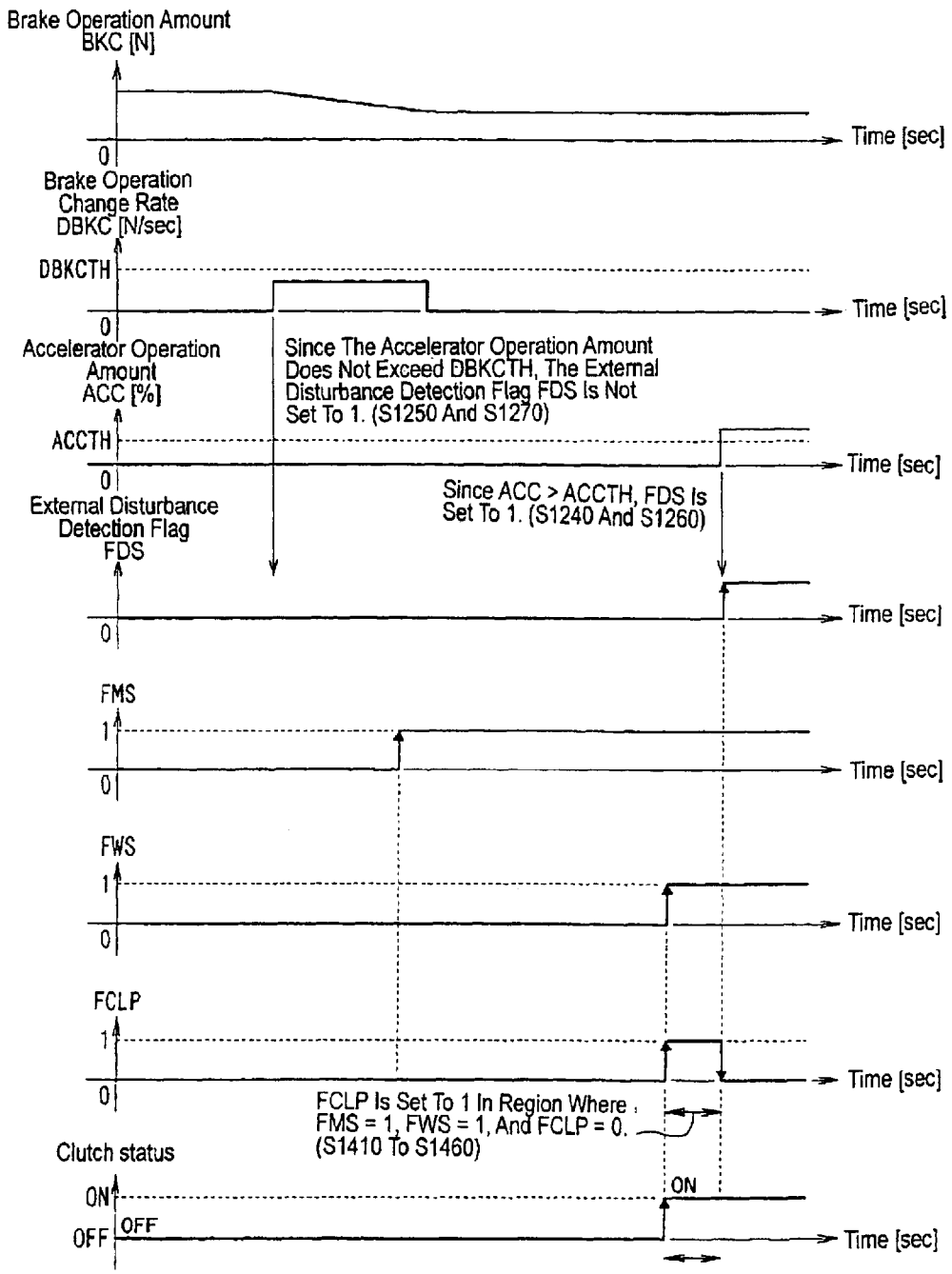
FIG. 18 are time charts for the vehicle driving force control apparatus illustrated in FIG. 1 of the illustrated embodiment of the present invention.

FIGS. 17 and 18 show example time charts of the clutch connection processing executed when the vehicle stops. As shown in FIG. 17, when the vehicle speed decreases, the driving force control apparatus finds the deceleration based on the detection values obtained from the wheel speed sensors 27RL and 27LL and the motor rotational speed sensor 26 up to the point when the respective minimum detectable rotational speeds LWS and LMS are reached. Based on the deceleration, the driving force control apparatus calculates the required wheel stopping time estimate value TWS and the required motor stopping time estimate value TMS at which the rotational speeds of the wheels and the electric motor 4, respectively, will become zero. Since both the required motor stopping time estimate value TMS and the required wheel stopping time estimate value TWS are counted down and the clutch connection command is issued when both values have reached zero, the clutch 12 can be connected under conditions where the rotations of both the input shaft and the output shaft of the clutch 12 have definitely stopped.

While the required wheel stopping time estimate value TWS is being counted down, connection of the clutch 12 is prohibited if the brake or accelerator is operated beyond certain tolerances. However, as shown in FIG. 18, connection of the clutch 12 is not prohibited when the brake pedal 34 is operated below the tolerance level and, after connection of the clutch 12 has been completed, the connected state of the clutch 12 achieved while the vehicle was stopped is maintained even if the accelerator pedal 17 is operated beyond the tolerance level.

Although the four-wheel drive configuration of the embodiment is such that the electric motor 4 is driven by voltage generated by the generator 7, the invention is not limited to such a configuration. It is also acceptable to adopt a system provided with a battery that can deliver electric power to the electric motor 4. Such a system might be arranged such that the battery delivers a very small amount of electric power and the generator 7 can deliver electric power simultaneously along with the battery.

Moreover, although the embodiment uses an internal combustion engine as the main drive source, it is also acceptable to use an electric motor for the main drive source.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2002-235655. The entire disclosure of Japanese Patent Application No. 2002-235655 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle driving force control apparatus for a vehicle having a clutch installed in a torque transfer path from a drive source to a wheel, the clutch having an input part connected to the drive source and an output part connected to the wheel, the vehicle driving force control apparatus comprising:

an output rotational speed sensor configured to detect an output rotational speed of the output part of the clutch and produce an output rotational speed value;

an input rotational speed sensor configured to detect an input rotational speed of the input part of the clutch and produce an input rotational speed value;

an output stop estimating section configured to estimate that rotation of the output part has stop rotating upon an occurrence of a detected first parameter that is based on the output rotational speed value received from the output rotational speed sensor;

an input stop estimating section configured to estimate that rotation of the input part has stop rotating upon an occurrence of a detected second parameter that is based on the input rotational speed value received from the input rotational speed sensor;

a vehicle stop determining section configured to determine whether the vehicle has stopped;

a clutch stop determining section configured to determine that the clutch has stopped rotating based on a determination of the occurrences of the detected output and input parameters, upon the vehicle stop determining section determining that the vehicle has stopped; and a clutch connection command outputting section configured to output a clutch connection command to connect the clutch, upon the clutch stop determining section determining that the clutch has stopped rotating.

2. The vehicle driving force control apparatus according to claim 1, wherein the output stop estimating section is further configured such that the detected first parameter is a first amount of time that is an estimation of time for the output part to stop rotating based on the output rotational speed value received from the output rotational speed sensor;

the input stop estimating section is further configured such that the detected second parameter is a second amount of time that is an estimation of time for the input part to stop rotating based on the input rotational speed value received from the input rotational speed sensor; and the clutch stop determining section is further configured such that the clutch has been determined to have stopped rotating based on the first and second amounts of time estimated by the output and input stop estimating sections having elapsed, upon the vehicle stop determining section determining that the vehicle has stopped.

3. The vehicle driving force control apparatus according to claim 2, wherein the vehicle stop determining section further configured to determine that the vehicle has stopped if the output rotational speed value of the output part falls below a minimum detectable rotational speed for the output rotational speed sensor.

4. The vehicle driving force control apparatus according to claim 2, further comprising an acceleration instruction sensor configured to detect an acceleration instruction of the vehicle; and a clutch connection prohibiting section configured to prohibit the output of the clutch connection command by the clutch connection command outputting section, upon the acceleration instruction sensor detecting the acceleration instruction of the vehicle, regardless of the vehicle stop determining section determining whether the vehicle has stopped.

5. The vehicle driving force control apparatus according to claim 2, further comprising a brake operation amount sensor configured to detect a brake operation amount of the vehicle;

a brake operation change amount determining section configured to determine whether a change in the brake operation amount per unit time is at least equal to a prescribed value, using the brake operation amount detected by the brake operation amount sensor; and a clutch connection prohibiting section configured to prohibit the clutch connection by the clutch connection command outputting section, upon the brake operation change amount determining section determining that the change in the brake operation amount per unit time is at least equal to the prescribed value, regardless of the vehicle stop determining section determining whether the vehicle has stopped.

6. The vehicle driving force control apparatus according to claim 2, wherein the clutch stop determining section is further configured to modify the first and second amounts of time estimated by the input and output stop estimating sections to take into account a response delay time of the clutch.

7. The vehicle driving force control apparatus according to claim 1, further comprising an acceleration slippage detection section configured to detect if acceleration slippage is occurring in a drive wheel that is driven by a vehicle drive source; and a generator control section configured to control a generation load torque of a generator to substantially correspond to an acceleration slippage magnitude of the drive wheel, when the acceleration slippage detection section estimates acceleration slippage occurring in the drive wheel.

8. The vehicle driving force control apparatus according to claim 1, further comprising a drive mode selection section configured to select one of a multi-wheel drive mode in which at least the wheel driven by the drive source connected through the clutch is driven and at least one other drive wheel is driven by a drive source not connected by the clutch, and a non-all wheel drive mode in which at least the clutch disconnects the drive source connected to the wheel through the clutch, while the vehicle is traveling; and the clutch connection command outputting section being further configured to output the clutch connection command to connect the clutch when the multi-wheel drive mode has been designated.

9. A vehicle driving force control apparatus for a vehicle having a clutch installed in a torque transfer path from a drive source to a wheel, the clutch having an input part connected to the drive source and an output part connected to the wheel, the vehicle driving force control apparatus comprising:

output rotational speed detecting means for detecting an output rotational speed of the output part of the clutch and produce an output rotational speed value;

input rotational speed detecting means for detecting an input rotational speed of the input part of the clutch and produce an input rotational speed value;

output stop estimating means for estimating that rotation of the output part has stop rotating upon an occurrence of a detected first parameter that is based on the output rotational speed value received from the output rotational speed detecting means;

input stop estimating means for estimating that rotation of the input part has stop rotating upon an occurrence of a detected second parameter that is based on the input rotational speed value received from the input rotational speed detecting means;

vehicle stop determining means for determining whether the vehicle has stopped;

clutch stop determining means for determining that the clutch has stopped rotating based on a determination of the occurrences of the detected output and input parameters, upon the vehicle stop determining means determining that the vehicle has stopped; and clutch connection command outputting means for outputting a clutch connection command to connect the clutch, upon the clutch stop determining means determining that the clutch has stopped rotating.

10. The vehicle driving force control apparatus according to claim 9, wherein the output stop estimating means is further configured such that the detected first parameter is a first amount of time that is an estimation of time for the output part to stop rotating based on the output rotational speed value received from the output rotational speed detecting means;

the input stop estimating means is further configured such that the detected second parameter is a second amount of time that is an estimation of time for the input part to stop rotating based on the input rotational speed value received from the input rotational speed detecting means; and the clutch stop determining section is further configured such that the clutch has been determined to have stopped rotating based on the first and second amounts of time estimated by the output and input stop estimating means having elapsed, upon the vehicle stop determining means determining that the vehicle has stopped.

11. A vehicle driving force controlling method for a vehicle having a clutch installed in a torque transfer path from a drive source to a wheel, the clutch having an input part connected to the drive source and an output part connected to the wheel, the method comprising:

detecting an output rotational speed of the output part of the clutch and produce an output rotational speed value;

detecting an input rotational speed of the input part of the clutch and produce an input rotational speed value;

estimating that the rotation of the output part has stop rotating upon an occurrence of a detected first parameter that is based on the output rotational speed value;

estimating that the rotation of the input part has stop rotating upon an occurrence of a detected second parameter that is based on the input rotational speed value;

determining whether the vehicle has stopped;

determining that the clutch has stopped rotating based on a determination of the occurrences of the detected output and input parameters, upon determining that the vehicle has stopped; and outputting a clutch connection command to connect the clutch, upon determining that the clutch has stopped rotating.

12. The vehicle driving force controlling method according to claim 11, wherein the estimating of the output part has stopped rotating is conducted by estimating a first amount of time as the detected first parameter that is an estimate of the output part stopping rotation based on the output rotational speed value;

the estimating of the input part has stopped rotating is conducted by estimating a second amount of time as the detected second parameter that is an estimate of the input part stopping rotation based on the input rotational speed value; and the determining that the clutch stopped rotating based on the first and second amounts of time having elapsed, upon determining that the vehicle has stopped.

13. A vehicle driving force control apparatus for a vehicle having at least one first drive wheel and at least one second drive wheel, the vehicle driving force control apparatus comprising:

a first drive source configured to transmit a first drive torque the first drive wheel;

a clutch installed in a torque transfer path formed between the first drive source and the first drive wheel, the clutch having an input part connected to the first drive source and an output part connected to the first drive wheel;

an output rotational speed sensor configured to detect an output rotational speed of the output part of the clutch and produce an output rotational speed value;

an input rotational speed sensor configured to detect an input rotational speed of the input part of the clutch and produce an input rotational speed value;

an output stop estimating section configured to estimate that rotation of the output part has stop rotating upon an occurrence of a detected first parameter that is based on the output rotational speed value received from the output rotational speed sensor;

an input stop estimating section configured to estimate that rotation of the input part has stop rotating upon an occurrence of a detected second parameter that is based on the input rotational speed value received from the input rotational speed sensor;

a vehicle stop determining section configured to determine whether the vehicle has stopped;

a clutch stop determining section configured to determine that the clutch has stopped rotating based on a determination of the occurrences of the detected output and input parameters, upon the vehicle stop determining section determining that the vehicle has stopped; and a clutch connection command outputting section configured to output a clutch connection command to connect the clutch, upon the clutch stop determining section determining that the clutch has stopped rotating.

14. The vehicle driving force control apparatus according to claim 13, wherein the output stop estimating section is further configured such that the detected first parameter is a first amount of time that is an estimation of time for the output part to stop rotating based on the output rotational speed value received from the output rotational speed sensor;

the input stop estimating section is further configured such that the detected second parameter is a second amount of time that is an estimation of time for the input part to stop rotating based on the input rotational speed value received from the input rotational speed sensor; and the clutch stop determining section is further configured such that the clutch has been determined to have stopped rotating based on the first and second amounts of time estimated by the output and input stop estimating sections having elapsed, upon the vehicle stop determining section determining that the vehicle has stopped.

15. The vehicle driving force control apparatus according to claim 14, wherein the vehicle stop determining section further configured to determine that the vehicle has stopped if the output rotational speed value of the output part falls below a minimum detectable rotational speed for the output rotational speed sensor.

16. The vehicle driving force control apparatus according to claim 14, further comprising an acceleration instruction sensor configured to detect an acceleration instruction of the vehicle; and a clutch connection prohibiting section configured to prohibit the output of the clutch connection command by the clutch connection command outputting section, upon the acceleration instruction sensor detecting the acceleration instruction of the vehicle, regardless of the vehicle stop determining section determining whether the vehicle has stopped.

17. The vehicle driving force control apparatus according to claim 14, further comprising a brake operation amount sensor configured to detect a brake operation amount of the vehicle;

a brake operation change amount determining section configured to determine whether a change in the brake operation amount per unit time is at least equal to a prescribed value, using the brake operation amount detected by the brake operation amount sensor; and a clutch connection prohibiting section configured to prohibit the clutch connection by the clutch connection command outputting section, upon the brake operation change amount determining section determining that the change in the brake operation amount per unit time is at least equal to the prescribed value, regardless of the vehicle stop determining section determining whether the vehicle has stopped.

18. The vehicle driving force control apparatus according to claim 14, wherein the clutch stop determining section is further configured to modify the first and second amounts of time estimated by the input and output stop estimating sections to take into account a response delay time of the clutch.

19. The vehicle driving force control apparatus according to claim 13, further comprising an acceleration slippage detection section configured to detect if acceleration slippage is occurring in a second drive wheel that is driven by a second drive source; and a generator control section configured to control a generation load torque of a generator to substantially correspond to an acceleration slippage magnitude of the second drive wheel, when the acceleration slippage detection section estimates acceleration slippage occurring in the second drive wheel.

20. The vehicle driving force control apparatus according to claim 13, further comprising a drive mode selection section configured to select one of a multi-wheel drive mode in which at least the first wheel driven by the first drive source connected through the clutch is driven and at least one second drive wheel is driven by a second drive source not connected by the clutch, and a non-all wheel drive mode in which at least the clutch disconnects the drive source connected the first wheel through the clutch, while the vehicle is traveling; and the clutch connection command outputting section being further configured to output the clutch connection command to connect the clutch when the multi-wheel drive mode has been designated.

21. The vehicle driving force control apparatus according to claim 13, further comprising a second drive source configured to transmit a second drive torque to the second drive wheel and a torque to a generator that supplies electrical power to the first drive source.

* * * * *